US007085795B2

(12) United States Patent
Debes et al.

(10) Patent No.: US 7,085,795 B2
(45) Date of Patent: Aug. 1, 2006

(54) APPARATUS AND METHOD FOR EFFICIENT FILTERING AND CONVOLUTION OF CONTENT DATA

(75) Inventors: Eric Debes, Santa Clara, CA (US); William W. Macy, Palo Alto, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 09/952,891

(22) Filed: Oct. 29, 2001

(65) Prior Publication Data

US 2003/0084082 A1 May 1, 2003

(51) Int. Cl.
*G06F 17/15* (2006.01)

(52) U.S. Cl. ........................ 708/603; 708/319; 708/420; 708/422

(58) Field of Classification Search ................. 708/603, 708/319, 420, 422; 712/221
See application file for complete search history.

(56) References Cited

U.S. PATENT DOCUMENTS 6,115,812 A * 9/2000 Abdallah et al. ........... 712/300
6,211,892 B1 * 4/2001 Huff et al. .................. 345/561
6,745,319 B1 * 6/2004 Balmer et al. .............. 712/223
2001/0016902 A1 * 8/2001 Abdallah et al. ........... 712/222

OTHER PUBLICATIONS

Diefendorff, K., et al., "AltiVec Extension to PowerPC Accelerates Media Processing," IEEE, #0272-1732/00, 2000, pp. 85–95.

Avaro, Olivier, et al., *MPEG–4 Systems Overview and Architecture,* woody.imag.fr/MPEG4/syssite/syspub/docs/tutorial/, May 5, 1998, pp. 1–71 plus Yahoo site ref.

Bierling, M., *Displacement Estimation by Hierarchical Blockmatching,* SPIE, vol. 1001, Visual Communications and Image Processing, May 1998, pp. 942–951.

Chan, Y.L. and W.C. Siu, *Adaptive Multiple–Candidate Hierarchical Search for Block Matching Algorithm,* IEE Electronics Letters, vol. 31, No. 19, Sep. 14, 1995, pp. 1637–1639.

Chan, Yui–Lam and Wan–Chi Siu, *New Adaptive Pixel Decimation for Block Motion Vector Estimation,* IEEE Transactions on Circuits and Systems on Video Technology, vol. 6 No. 1, Feb. 1996, pp. 113–118.

(Continued)

*Primary Examiner*—D. H. Malahn
(74) *Attorney, Agent, or Firm*—Larry M. Mennemeier

(57) ABSTRACT

An apparatus and method for efficient filtering and convolution of content data are described. The method includes organizing, in response to executing a data shuffle instruction, a selected portion of data within a destination data storage device. The portion of data is organized according to an arrangement of coefficients within a coefficient data storage device. Once organized, a plurality of summed-product pairs are generated in response to executing a multiply-accumulate instruction. The plurality of product pairs are formed by multiplying data within the destination data storage device and coefficients within the coefficient data storage device. Once generated, adjacent summed-product pairs are added in response to executing an adjacent-add instruction. The adjacent summed-product pairs are added within the destination data storage device to form one or more data processing operation results. Once the one or more data processing operation results are formed, the results are stored within a memory device.

33 Claims, 14 Drawing Sheets

OTHER PUBLICATIONS

Chen, Liang–Gee, Wai–Ting Chen, Yeu–Shen Jehng Tzi–Dar Chuieh, *An Efficient Parallel Motion Estimation Algorithm for Digital Image Processing,* IEEE Transactions on Circuits and Systems on Video Technology, vol. 1, No. 4, Dec. 1991, pp. 378–384.

Cheng, K.W., S.C. Chan, *Fast Block Matching Algorithms for Motion Estimation,* ICASSP96, 1996, pp. 2318ff.

Corbal, Jesus, et al., *DLP+TLP Processors for the Next Generation of Media Workloads,* 0–7695–1019–1/01, IEEE, 2001, pp. 219–228.

Day, Neil, Ed., *Introduction to MPEG–7* (*v.3.0*), International Organization for Standardization, ISO/IEC JTC1/SC29/WG11, Coding of Moving Pictures and Audio, #N4032, Mar. 2001, pp. 1–10.

Dufaux, Frederic, et al., *Efficient, Robust, and Fast Global Motion Estimation for Video Coding,* 1057–7149/00, IEEE, 2000, pp. 497–501.

Eckart, Stefan, Chad Fogg, *ISO/IEC MPEG–2 Software Video Codec,* SPIE vol. 2419, Digital Video Compression: Algorithms and Technologies, 1995, San Jose, CA.

Edirisinghe, E.A., et al., *Shape Adaptive Padding for MPEG–4,* 0098 3063/00, IEEE, 2000, pp. 514–520.

Feng, J., Lo, K. T. Mehrpour, H. Karbowiak, A.E., *Adaptive Block–Matching Motion Estimation Algorithm for Video Coding,* IEE Electronics Letters, vol. 31, No. 18, 1995, pp. 1542–1543.

Furht, Botho, Joshua Greenberg, Raymond Westwater, *Motion Estimation Algorithm for Video Compression,* Kluwer Academic Publishers, Boston, 1997, pp. cover–vi, 11, 49–95.

Ghanbari, M., *The Cross–Search Algorithm for Motion Estimation,* IEEE Transactions on Communications, vol. 38, No. 7, Jul. 1990, pp. 950–953.

He, Zhongli, M.L. Liou, *A High Performance Fast Search Algorithm for Block Matching Motion Estimation,* IEEE Transactions on Circuits and Systems on Video Technology, vol. 7, No. 5, Oct. 1997, pp. 826–828.

He, Zhong–Li, M.L. Liou, *Design of Fast Motion Estimation Algorithm based on Hardware Consideration,* IEEE Transactions on Circuits and Systems on Video Technology, vol. 7, No. 5, Oct. 1997, pp. 819–823.

Heising, G., et al., *MoMuSys: MPEG–4 Version 2 Video Reference Software Package,* AC098/HHI/WP5.1/DS/P/049/BI, 1998, Abstract and pp. 1–8.

Intel Corporation, *Block–Matching in Motion Estimation Alforithms Using Streaming SIMD Extension 2* (*SSE2*), Vers. 2.0 Sep. 22, 2000, Order No. 248605–001, pp. 1–13, A–1, A–2.

International Organisation for Standardisation, *Optimization Model, Version 2.0,* ISO/IEC JTC1/SC29/WG11, Coding of Moving Pictures and Audio, #N3675, Oct. 2000, 12 pp.

International Organisation for Standardisation, *New MPEG–4 Profiles Under Consideration,* ISO/IEC JTC1/SC29/WG11, Coding of Moving Pictures and Audio, #N3932, Jan. 2001, pp. 1–35.

Jain, J., A. Jain, *Displacement Measurement and its Application in Interframe Image Coding,* IEEE Transactions on Communications, vol. 29, No. 12, Dec. 1981, pp. 1799–1808.

Ju, John C.–H., et al., *A Fast Rate–Optimized Motion Estimation Algorithm for Low–Bit–Rate Video Coding,* 1051–8215/99, IEEE, 1999, pp. 994–1002.

Jung, Hae Mook, Duch Dong Hwang Coong Soo Park, Han Soo Kim, *An Annular Search Algorithm for Efficient Motion Estimation,* International Picture Coding Symposium, PCS96, 1996, pp. 171–174.

Kappagantula, S., K.R. Rao, *Motion Compensated Interframe Image Prediction,* IEEE Transactions on Communications, 33(9), Sep. 1985, pp. 1011–1015.

Kim, Joon–Seek, Rae–Hong Park, *A Fast Feature–Based Block Matching Algorithm Using Integral Projections,* IEEE Journal on Selected areas in communications, vol. 10, No. 5, Jun. 1992, pp. 968–971.

Kim, Michelle, Ed., *MPEG–4 Systems,* International Organization for Standardization, ISO/IEC JTC1/SC29/WG11, Coding of Moving Pictures and Audio, #N3383, Jun. 2000, pp. 1–19.

Kneip, Johannes, et al., *Applying and Implementing the MPEG–4 Multimedia Standard,* 0272–1732/99, IEEE, 1999, pp. 64–74.

Kneip, J. (Johannes), et al., *The MPEG–4 Video Coding Standard—VLSI Point of View,* IEEE Workshop on Signal Processing Systems (SIPS98), Oct. 8–10, 1998, pp. 43–52, A–1, A–2.

Koga, J., et al., *Motion Compensated Interframe Coding for Video Conferencing,* Proceedings of the National Telecommunications Conference, 1981, pp. G5.3.1–5.3.3.

Koenen, Rob, Ed., *Overview of the MPEG–4 Standard,* International Organization for Standardization, ISO/IEC JTC1/SC29/WG11, Coding of Moving Pictures and Audio, #N4030, Mar. 2001, pp. 1–69.

Kuhn, P., *Algorithms, Complexity Analysis and VLSI Architectures for MPEG–4 Motion Estimation,* 1999 Kluwer Academic Publishers, Boston, pp. cover–vi, 15, 17–59, 107–109, 119–121, 147–167, and 189–204.

Kuhn, P., Stechele W., *Complexity Analysis of the Emerging MPEG–4 Standard as a Basis for VLSI Implementation,* vol. SPIE 3309 Visual Communications and Image Processing, San Jose, Jan. 1998, pp. 498–509.

Lee, Liang–Wei, Jhing–Fa Wang, Jau– Yien Lee, Jung–Dar Shie, *Dynamic Search–Window Adjustment and Interlaced Search Block–Matching Algorithm,* IEEE Transactions on circuits and systems for video technology, vol. 3, No. 1, Feb. 1993, pp. 85–87.

Lee, W., Y. Kim, R.J. Gove, C.J. Read, *Media Station 5000: Integrating Video and Audio,* IEEE Multimedia, vol. 1, No. 4, 1994, pp. 50–61.

Lee, Xiaobing, Ya–Qin Zhang, *A Fast Hierarchical Motion–Compensation Scheme for Video Coding Using Block–Feature Mathching,* IEEE Transactions on Circuits and Systems for Video Technology, vol. 6, No. 6, Dec. 1996, pp. 627–635.

Lengwehasatit, Krisda, et al., *A Novel Computationally Scalable Algorithm for Motion Estimation,* SPIE 3309 VCIP Visual Communications and Image processing, San Jose, CA, Jan. 1998, pp. 66–79.

Li, R., B. Zeng, M.L. Liu, *A New Three–Step Search Algorithm for Block Motion Estimation*, IEEE Transactions on Circuits and Systems on Video Technology, vol. 4, No. 4, Aug. 1994, pp. 438–442.

Li, W., E. Salari, *Successive Elimination Algorithm for Motion Estimation,* IEEE Trans. Image Processing, vol. 4, Jan. 1995, pp. 105–107.

Liang, Jie, et al., *Region–Based Video Coding with Embedded Zero–Trees,* 1068–0314/97, IEEE, 1997, p. 449.

Liu, B., A. Zaccarin, *New Fast Algorithms for the Estimation of Block Motion Vectors,* IEEE Transactions on Circuits and Systems on Video Technology, vol. 3, No. 2, Apr. 1993, pp. 148–157.

Liu, Lurng–Kuo, Ephraim Feig, *A Block–Based Gradient Descent Search Algorithm for Block–Based Motion Estimation in Video Coding,* IEEE Transactions on Circuits and Systems on Video Technology, vol. 6, No. 4, Aug. 1996, pp. 419–422.

Mo, Hyeon–Cheol, et al., *A High–Speed Pattern Decoder in MPEG–4 Padding Block Hardware Accelerator,* 0–7803–6685–9/01, IEEE, 2001, pp. II–197—II–200.

Moschetti, F., et al., *About Macroblock Subsampling for Motion Estimation on IA–64,* Proc. of 2001 IEEE Int'l. Conf. on Multimedia and Expo (ICME 2001), Tokyo, Japan, Aug. 2001, 4 pp.

Moschetti, F., et al., *A Fast Block Matching for SIMD Processors Using Subsampling,* IEEE #0–7803–5482–6/99, pp. IV–321—IV–324.

Nam, Kwon Moon, Joon–Seek Kim, Rae–Hong Park, Young Serk Shim, *A Fast Hierarchical Motion Vector Estimation Algorithm Using Mean Pyramid*, IEEE Transactions on Circuits and Systems on Video Technology, vol. 5, No. 4, Aug. 1995, pp. 344–351.

Netravali, A., B. Haskell, *Digital Pictures Representation and Compression,* New York, Plenum, 1988, pp. cover–xv, 334–340, 537–542, and 354–355.

Pirsch, Peter, Nicolas Demassieux, Winfried Gehrke, *VLSI Architectures for Video Compression—A Survey,* Proceedings of the IEEE, vol. 83, No. 2, Feb. 1995, pp. 220–246.

Po, Lai–Man, Wing–Chung Ma. *A Novel Four–Step Search Algorithm for Fast Blockmatching,* IEEE Transactions on Circuits and Systems on Video Technology, vol. 6, No. 3, Jun. 1996, pp. 313–317.

Puri, A., H.M. Hang, D.L. Schilling, *An Efficient Blockmatching Algorithm for Motion Compensated Coding,* Proc. IEEE ICASSP, 1987, pp. 2.4.1–25.4.4.

Ragsdale, Gary L., et al., *Relationships of Popular Transmission Characteristics to Perceived Quality for Digital Video Over ATM,* National Communications System, Technical Information Bulletin 99–2, Jan. 1999, 64 pp.

Ramkishor, K., et al., *Real Time Implementation of MPEG–4 Video Decoder on ARM7TDMI,* Proc. of 2001 Int'l. Symposium on Intelligent Multimedia, Video and Speech Processing, May 2–4, 2001, pp. 522–526.

Shi, Y.Q., X. Xia, *A Thresholding Multiresolution Block Matching Algorithm,* IEEE Transactions on Circuits and Systems on Video Technology, vol. 7, No. 2, Apr. 1997, pp. 437–440.

Sikora, Thomas, *MPEG Digital Video Coding Standards,* Preprint from Digital Consumer Electronics Handbook, 1st Ed., McGraw–Hill Book Co., Ch. 9, pp. 1–43.

Sikora, Thomas, *MPEG–1 and MPEG–2 Digital Video Coding Standards,* Preprint from Digital Consumer Electronics Handbook, 1st Ed., McGraw–Hill Book Co., pp. 1–43.

Sikora, Thomas, *The Structure of the MPEG–4 Video Coding Algorithm,* Preprint from Digital Consumer Electronics Handbook, 1st Ed., McGraw–Hill Book Co., pp. 1–16.

Song, Byung Cheol, Jong Beom Ra, *A Hierarchical Block Matching Algorithm Using Partial Distortion Criteria,* SPIE 3309 VCIP Visual Communications and Image Processing, 1998, San Jose, CA, pp. 88–95.

Srinivasan, Ram and K.R. Rao, *Predictive Coding Based on Efficient Motion Estimation,* IEEE Transactions on Circuits and Systems on Video Technology, vol. Com–33, No. 8, Aug. 1985, pp. 888–896.

Stolberg, H.–H., et al., *The M–Pire MPEG–4 Codec DSP and Its Macroblock Engine,* 0–7803–548206/99, IEEE, 2000, pp. II–192–II–195.

Tham, Jo Yew, et al., *Transactions Letters: A Novel Unrestricted Center–Biased Diamond Search Algorithm for Block Motion Estimation,* IEEE, 1051–8215/98, 1998, pp. 369–377.

van der Schaar, M., et al., *Near–Lossless Complexity–Scalable Embedded Compression Algorithm for Cost Reduction in DTV Receivers,* 0098 3063/00, IEEE, 2000, pp. 923–933.

Wang, Chung–Neng, et al., *Improved MPEG–4 Visual Texture Coding Using Double Transform Coding,* 0–7803–6685–9/01, IEEE, 2001, pp. V–227—V–230.

Westerink, P. H., et al., *Two–Pass MPEG02 Variable–Bit–Rate Encoding,* IBM J. Res. Develop, vol. 43, No. 4, Jul. 1999, pp. 471–488.

Wittenburg, J.P., et al., *HiPar–DSP: A Parallel VLIW RISC Processor for Real Time Image Processing Applications,* (0–7803–4229–1/97) IEEE, 1997, pp. 155–162.

Xu, Jie–Bin, Lai–man Po, and Chok–Kwan Cheung, *A New Prediction Model Search Algorithm for Fast Block Motion Estimation,* IEEE Int. Conf. Image Processing, ICIP97, Santa Barbara, 1997.

Yu, Fengqi and Alan N. Willson, Jr., *A Flexible Hardware–Oriented Fast Algorithm for Motion Estimation,* ICASSP97, 1997, pp. 2681ff.

Zhu, Shan, Kai–Kuang Ma, *A New Diamond Search Algorithm for Fast Block Matching,* IEEE Transactions on Circuits and Systems on Video Technology, vol. 9, No. 2, Feb. 2000, pp. 287–290.

* cited by examiner

REGISTER FILE 200
INTEGER REGISTERS 201
INSTRUCTION POINTER REGISTER 211
STATUS REGISTERS 208
REGISTERS 209
R1 212a
R2 212b
R3 212c
Ry 212h
0
127
INTERNAL BUS 205
BUS 101
DECODER 165
EXECUTION UNIT 203
CACHE 160
PROCESSOR 109

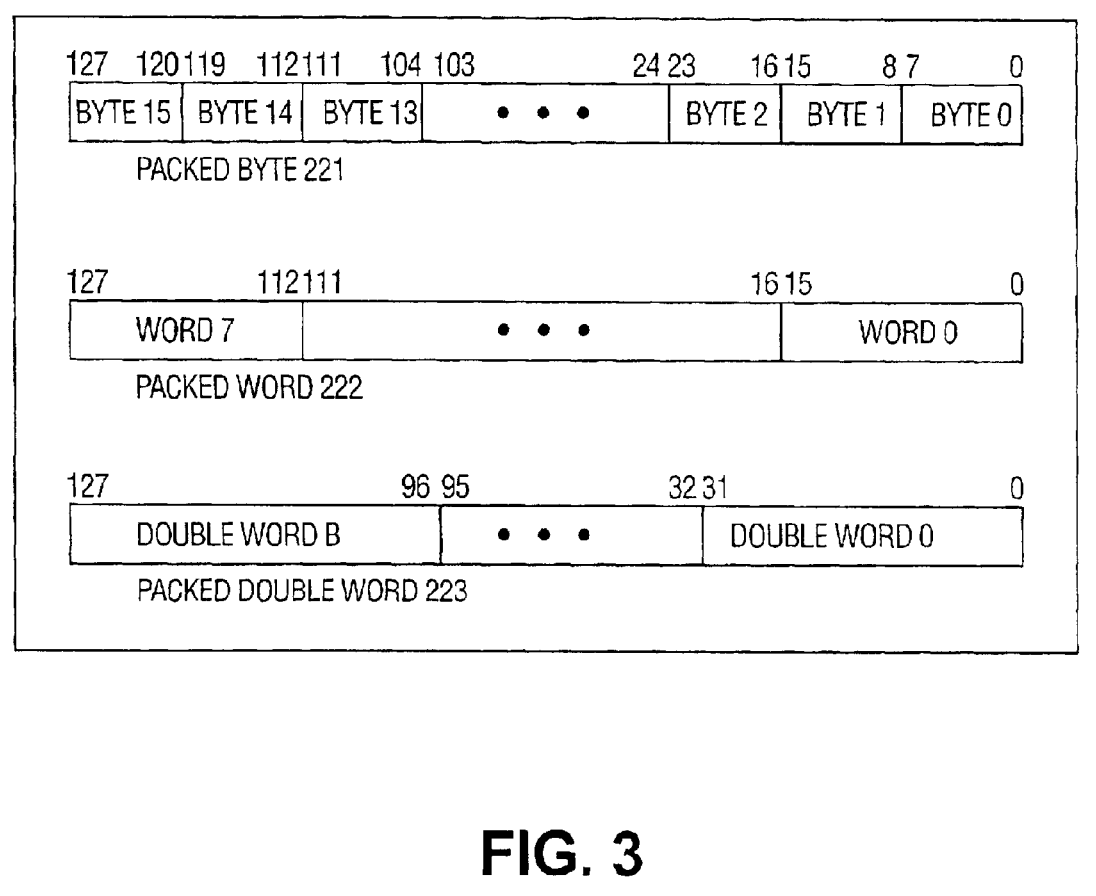

127 120 119 112 111 104 103 24 23 16 15 8 7 0

| BYTE 15 | BYTE 14 | BYTE 13 | • • • | BYTE 2 | BYTE 1 | BYTE 0 |
|---|---|---|---|---|---|---|

PACKED BYTE 221

127 112 111 16 15 0

| WORD 7 | • • • | WORD 0 |
|---|---|---|

PACKED WORD 222

127 96 95 32 31 0

| DOUBLE WORD B | • • • | DOUBLE WORD 0 |
|---|---|---|

PACKED DOUBLE WORD 223

FIG. 3

127 120 119 112 111 104 103 24 23 16 15 8 7 0 bbbb bbbb | bbbb bbbb | bbbb bbbb | • • • | bbbb bbbb | bbbb bbbb | bbbb bbbb

Figure 4A:
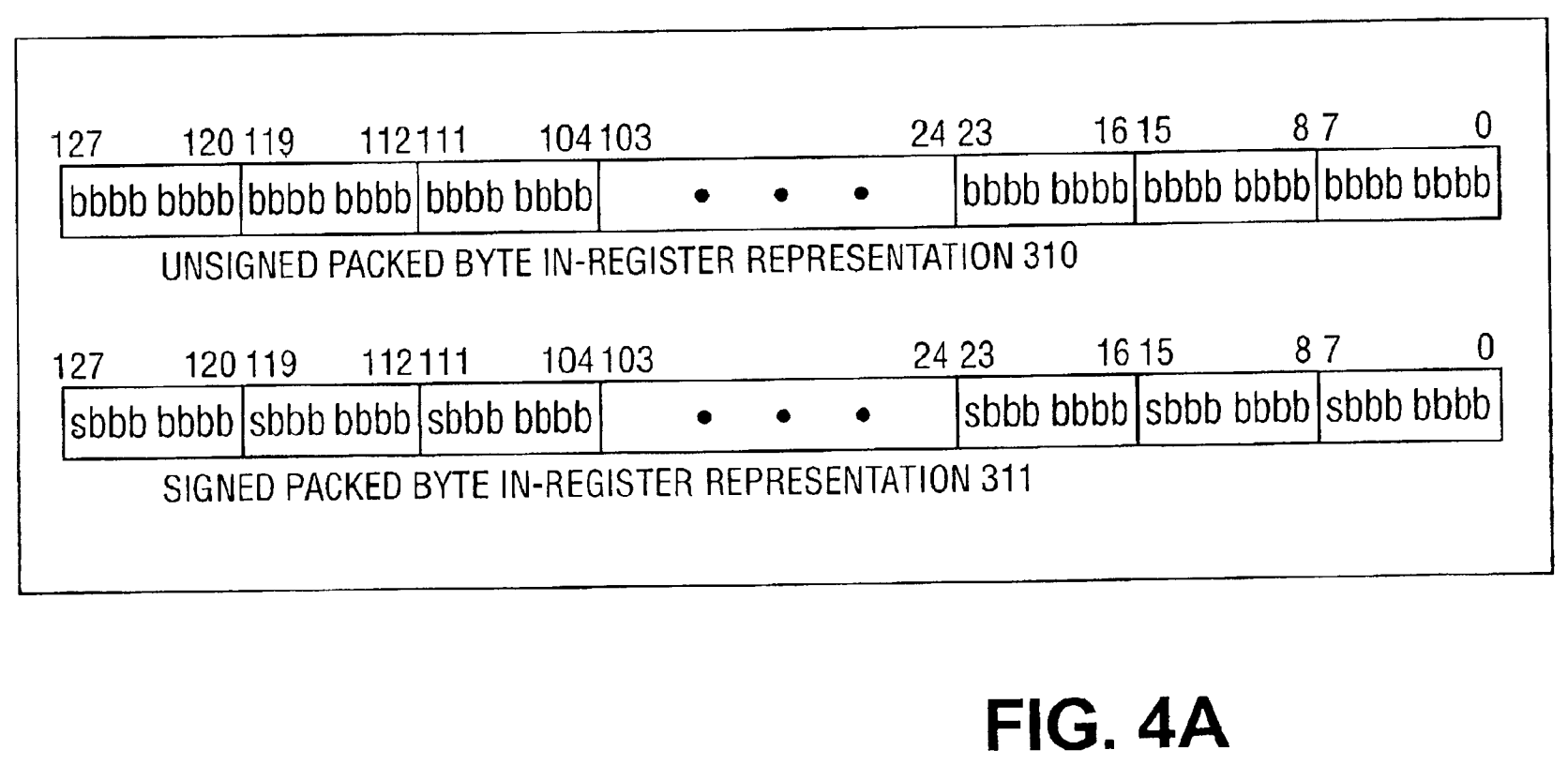

UNSIGNED PACKED BYTE IN-REGISTER REPRESENTATION 310

127 120 119 112 111 104 103 24 23 16 15 8 7 0 sbbb bbbb | sbbb bbbb | sbbb bbbb | • • • | sbbb bbbb | sbbb bbbb | sbbb bbbb

SIGNED PACKED BYTE IN-REGISTER REPRESENTATION 311

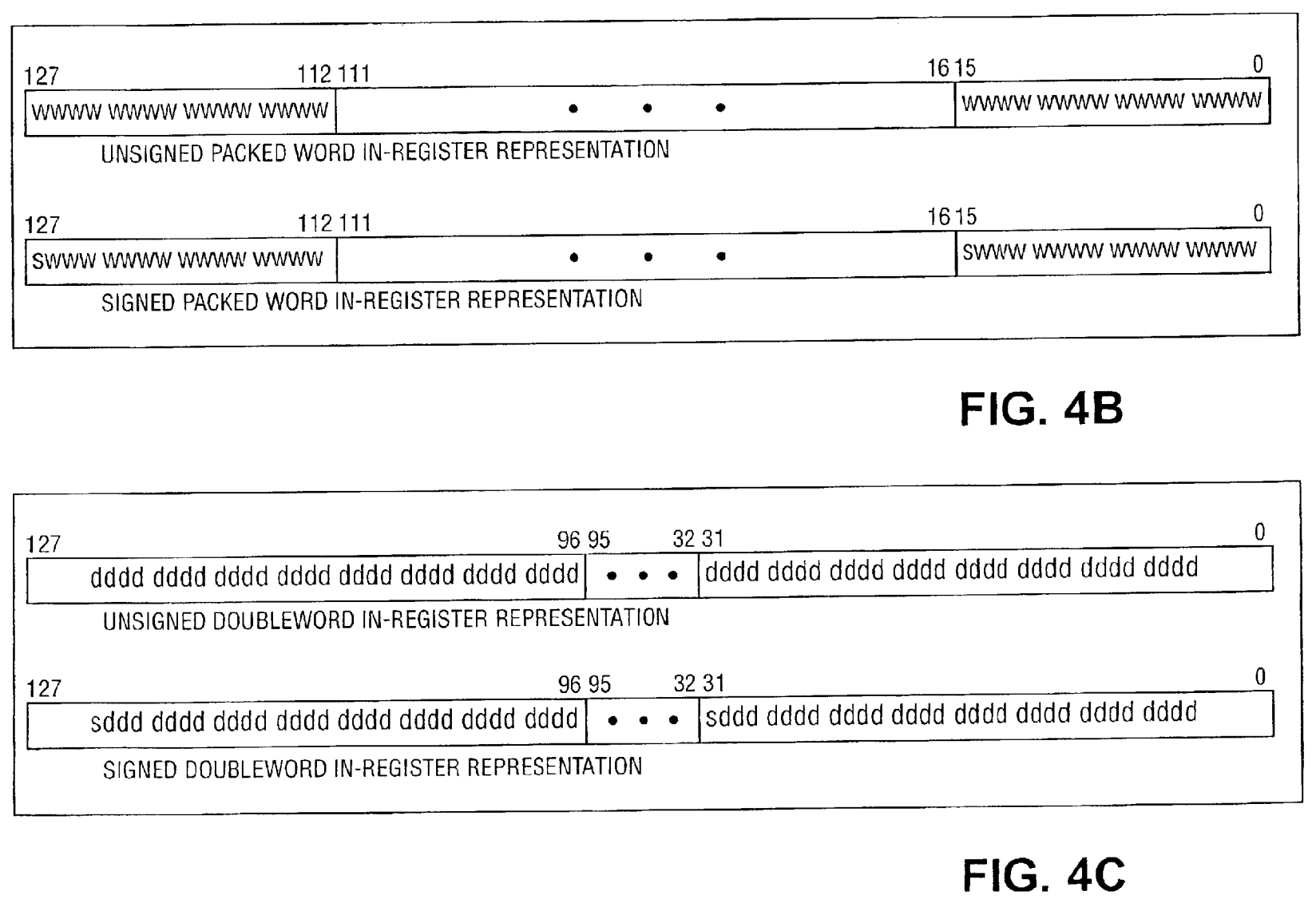

WWWW WWWW WWWW WWWW | • • • | WWWW WWWW WWWW WWWW

UNSIGNED PACKED WORD IN-REGISTER REPRESENTATION

127 | 112 111 | 16 15 | 0

SWWW WWWW WWWW WWWW | • • • | SWWW WWWW WWWW WWWW

SIGNED PACKED WORD IN-REGISTER REPRESENTATION

FIG. 4B

127 | 96 95 | 32 31 | 0 dddd dddd dddd dddd dddd dddd dddd dddd | • • • | dddd dddd dddd dddd dddd dddd dddd dddd

UNSIGNED DOUBLEWORD IN-REGISTER REPRESENTATION

127 | 96 95 | 32 31 | 0 sddd dddd dddd dddd dddd dddd dddd dddd | • • • | sddd dddd dddd dddd dddd dddd dddd dddd

SIGNED DOUBLEWORD IN-REGISTER REPRESENTATION

| 0 | 0 | 0 | 0 | 0 | 0 | 0 | 0 | 0 | 0 | 0 | 0 | 0 | F3 | F2 | F1 |
|---|---|---|---|---|---|---|---|---|---|---|---|---|---|---|---|

FIG. 7A

PSHUFD

504

| 0 | F3 | F2 | F1 | 0 | F3 | F2 | F1 | 0 | F3 | F2 | F1 | 0 | F3 | F2 | F1 |
|---|---|---|---|---|---|---|---|---|---|---|---|---|---|---|---|

| A7 | A6 | A5 | A4 | A6 | A5 | A4 | A3 | A5 | A4 | A3 | A2 | A4 | A3 | A2 | A1 |
|---|---|---|---|---|---|---|---|---|---|---|---|---|---|---|---|

PMADDUSBW

508

| 0 | F3 | F2 | F1 | 0 | F3 | F2 | F1 | 0 | F3 | F2 | F1 | 0 | F3 | F2 | F1 |
|---|---|---|---|---|---|---|---|---|---|---|---|---|---|---|---|

=

510

| A6F3 | A5F2+A4F1 | A5F3 | A4F2+A3F1 | A4F3 | A3F2+A2F1 | A3F3 | A2F2+A1F1 |
|---|---|---|---|---|---|---|---|

FIG. 7C

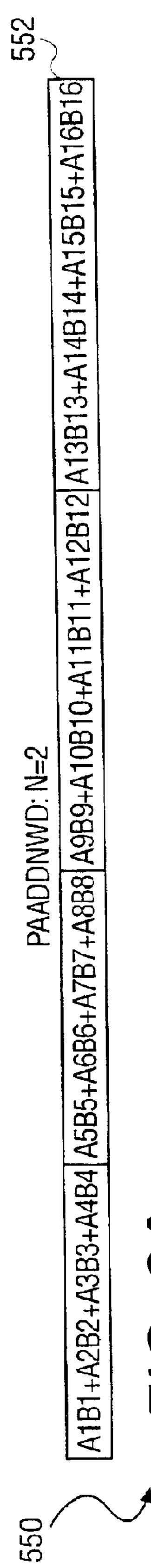
FIG. 8A
554
PAADDNWD: N=4
A1B1+A2B2+A3B3+A4B4+A5B5+A6B6+A7B7+A8B8
A9B9+A10B10+A11B11+A12B12+A13B13+A14B14+A15B15+A16B16
FIG. 8B
556
PAADDNWD: N=8
A1B1+A2B2+A3B3+A4B4+A5B5+A6B6+A7B7+A8B8+A9B9+A10B10+A11B11+A12B12+A13B13+A14B14+A15B15+A16B16
FIG. 8C
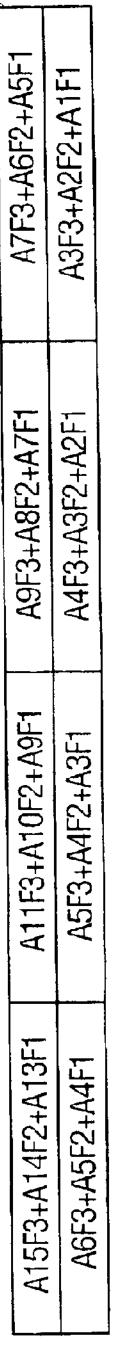
FIG. 8D

APPARATUS AND METHOD FOR EFFICIENT FILTERING AND CONVOLUTION OF CONTENT DATA

FIELD OF THE INVENTION

The invention relates generally to the field of filtering and convolution of content data. More particularly, the invention relates to a method and apparatus for efficient filtering and convolution of content data.

BACKGROUND OF THE INVENTION

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing (PC) experience will be even richer in audio-visual effects, as well as being easier to use, and more importantly, computing will merge with communications.

Accordingly, the display of images, as well as playback of audio and video data, which is collectively referred to herein as content, have become increasingly popular applications for current computing devices. Filtering and convolution operations are some of the most common operations performed on content data, such as image audio and video data. As known to those skilled in the art, filtering and correlation calculations are computed with a multiply-accumulate operation that adds the products of data and coefficients. The correlation of two vectors, A and B, consists in the calculation of the sum S:

$$S[k] = \frac{1}{N}\sum_{i=0}^{N-1} a[i]\cdot b[i+k], \quad \text{Equation (1)}$$

that is very often used with k=0:

$$S[0] = \frac{1}{N}\sum_{i=0}^{N-1} a[i]\cdot b[i] \quad \text{Equation (2)}$$

In case of an N tap filter f applied to a vector V, the sum S to be calculated is the following:

$$S = \sum_{i=0}^{N-1} f[i]\cdot V[i] \quad \text{Equation (3)}$$

Such operations are computationally intensive, but offer a high level of data parallelism that can be exploited through an efficient implementation using various data storage devices, such as for example, single instruction multiple data (SIMD) registers.

Applications of filtering operations are found in a wider array of image and video processing tasks and communications. Examples of uses of filters are reduction of block artifacts in motion picture expert group (MPEG) video, reducing noise and audio, decoupling watermarks from pixel values to improve watermark detection, correlation for smoothing, sharpening, reducing noise, finding edges and scaling the sizes of images or videoframes, upsampling videoframes for sub-pixel motion estimation, enhancing audio signal quality, and pulse shaping and equalizing the signal in communications. Accordingly, filtering as well as convolution operations are vital to computing devices which offer playback of content, including image, audio and video data.

Unfortunately, current methods and instructions target the general needs of filtering and are not comprehensive. In fact, many architectures do not support a means for efficient filter calculations for a range of filter lengths and data types. In addition, data ordering within data storage devices such as SIMD registers, as well as a capability of adding adjacent values in a register and for partial data transfers between registers, are generally not supported. As a result, current architectures require unnecessary data type changes which minimizes the number of operations per instruction and significantly increases the number of clock cycles required to order data for arithmetic operations.

Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which:

FIG. 3 depicts a block diagram illustrating a packed data types according to a further embodiment of the present invention.

FIG. 4A illustrates an in-register packed byte representations according to one embodiment of the present invention.

FIG. 4B illustrates an in-register packed word representation according to one embodiment of the present invention.

FIG. 4C illustrates an in-register packed double word representations according to one embodiment of the present invention.

FIGS. 7A–7C depict block diagrams illustrating the byte shuffle instruction of FIG. 5 combined with the byte multiply accumulate instruction as depicted in FIG. 6 to generate a plurality of summed-product pairs in accordance with a further embodiment of the present invention.

FIGS. 8A–8D depict block diagrams illustrating an adjacent-add instruction in accordance with a further embodiment of the present invention;

DETAILED DESCRIPTION

Figure 1:
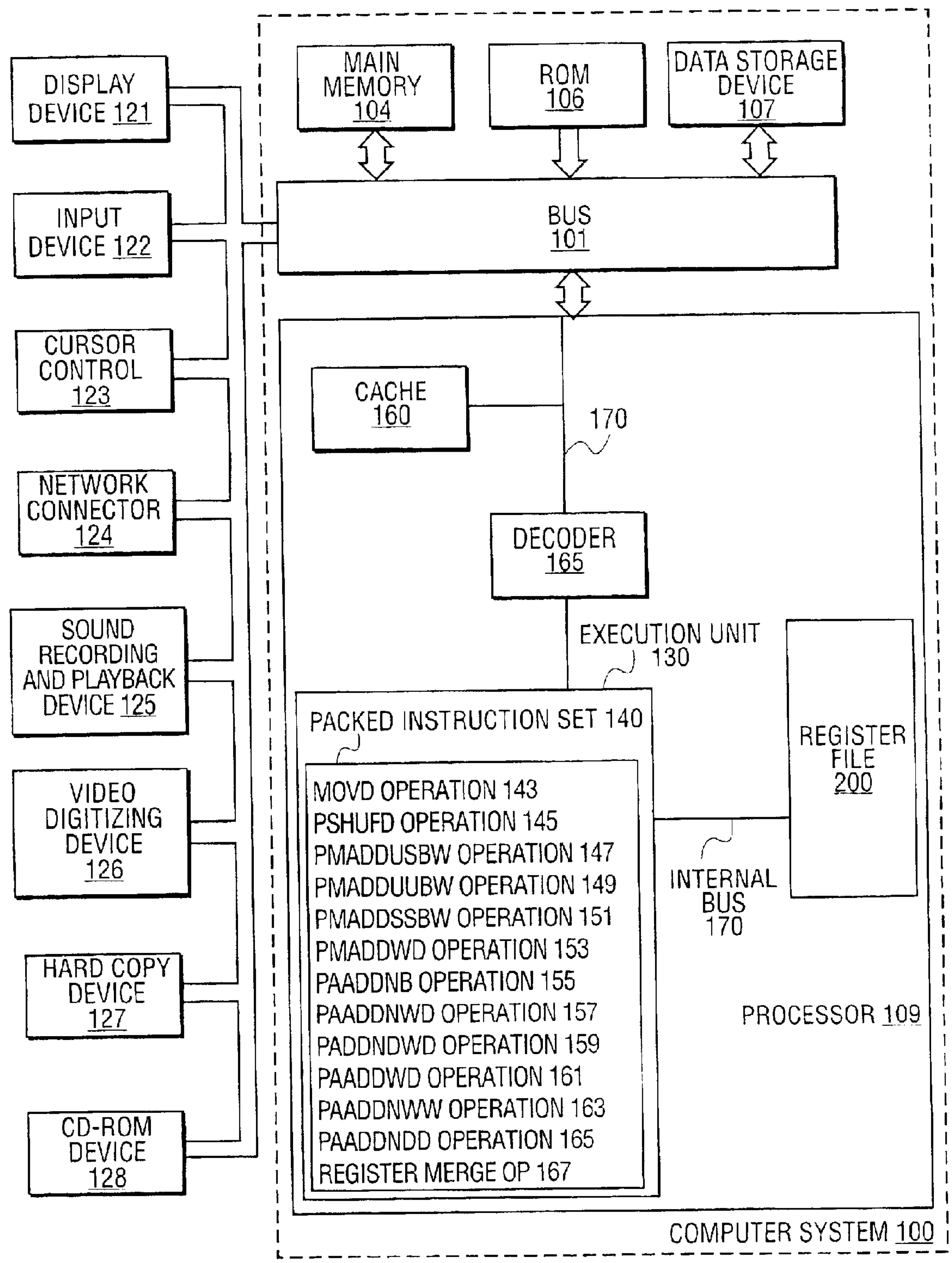
FIG. 1 depicts a block diagram illustrating a computer system capable of implementing of one embodiment of the present invention.

A method and apparatus for efficient filtering and convolution of content data are described. The method includes organizing, in response to executing a data shuffle instruction, a selected portion of data within a destination data storage device. The portion of data is organized according to an arrangement of coefficients within a coefficient data storage device. Once organized, a plurality of summed-product pairs are generated in response to executing a multiply-accumulate instruction. The plurality of product pairs are formed by multiplying data within the destination data storage device and coefficients within the coefficient data storage device. Once generated, adjacent summed-product pairs are added in response to executing an adjacent-add instruction. The adjacent summed-product pairs are added within the destination data storage device to form one or more data processing operation results. Once the one or more data processing operation results are formed, the results are stored within a memory device.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Computing Architecture

FIG. 1 shows a computer system 100 upon which one embodiment of the present invention can be implemented. Computer system 100 comprises a bus 101 for communicating information, and processor 109 coupled to bus 101 for processing information. The computer system 100 also includes a memory subsystem 104–107 coupled to bus 101 for storing information and instructions for processor 109.

Processor 109 includes an execution unit 130, a register file 200, a cache memory 160, a decoder 165, and an internal bus 170. Cache memory 160 is coupled to execution unit 130 and stores frequently and/or recently used information for processor 109. Register file 200 stores information in processor 109 and is coupled to execution unit 130 via internal bus 170. In one embodiment of the invention, register file 200 includes multimedia registers, for example, SIMD registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. Processor 109 is capable of supporting the Pentium® microprocessor instruction set and the packed instruction set 140. By including packed instruction set 140 in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the packed instruction set 140 includes instructions (as described in further detail below) for a move data (MOVD) operation 143, and a data shuffle operation (PSHUFD) 145 for organizing data within a data storage device. A packed multiply and accumulate for an unsigned first source register and a signed second source register (PMADDUSBW operation 147). A packed multiply-accumulate operation (PMADDUUBW operation 149) for performing a multiply and accumulate for an unsigned first source register and an unsigned second source register. A packed multiply-accumulate (PMADDSSBW operation 151) for signed first and second source registers and a standard multiply accumulate (PMADDWD operation 153) for signed first and second source registers containing 16-bit data. Finally, the packed instruction set includes an adjacent-add instruction for adding adjacent bytes (PAADDNB operation 155), words (PAADDNWD operation 157), and doublewords (PAADDNDWD 159), two word values PAADDWD 161), two words to produce a 16-bit result (PAADDNWW operation 163), two quadwords to produce a quadword result (PAADDNDD operation 165) and a register merger operation 167.

By including the packed instruction set 140 in the instruction set of the general-purpose processor 109, along with associated circuitry to execute the instructions, the operations used by many existing multimedia applications may be performed using packed data in a general-purpose processor. Thus, many multimedia applications may be accelerated and executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the present invention may include a display device 121 such as a monitor. The display device 121 may include an intermediate device such as a frame buffer. The computer system 100 also includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN).

Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Processor

Figure 2:
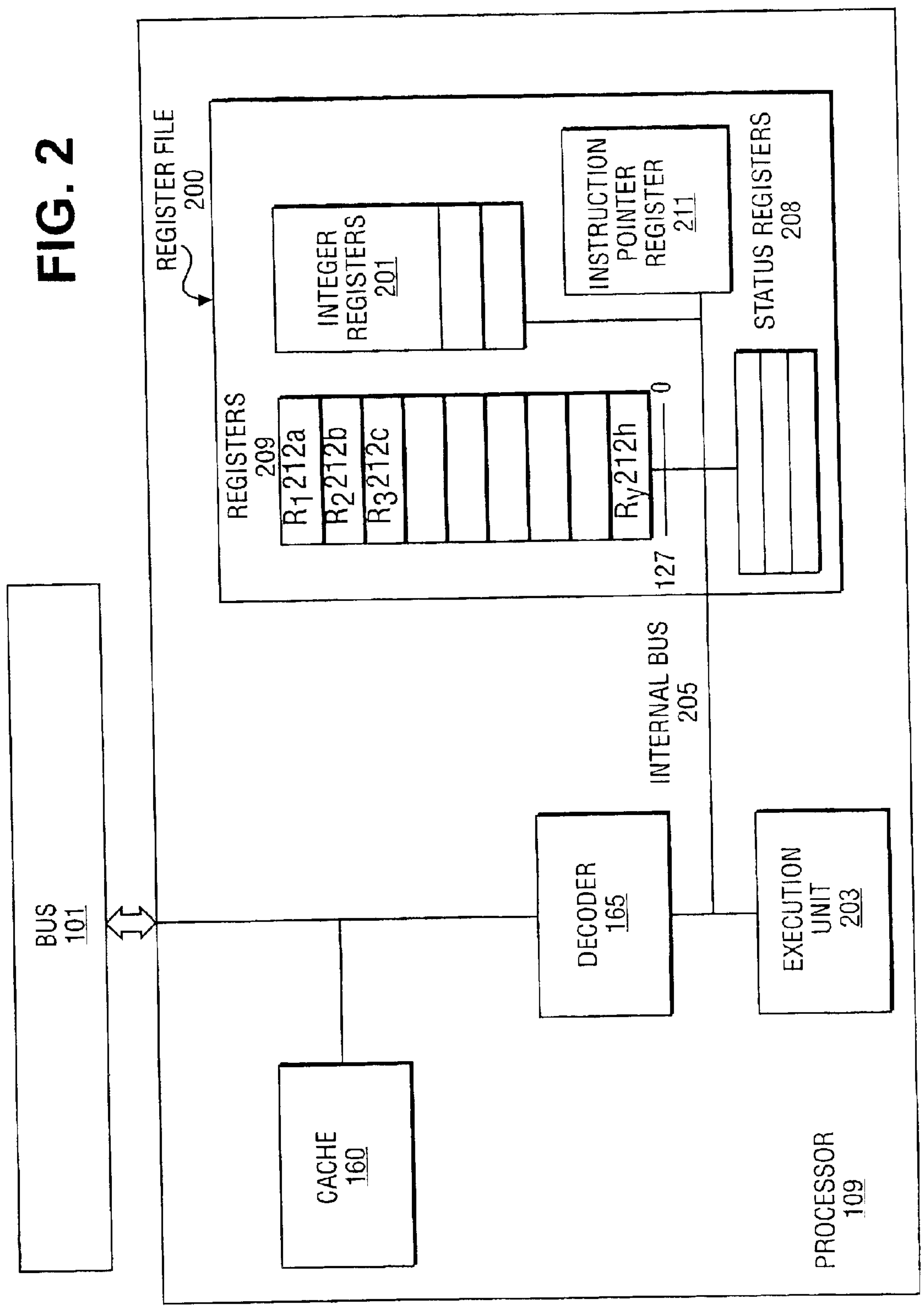
FIG. 2 depicts a block diagram illustrating an embodiment of the processor as depicted in FIG. 1 in accordance with a further embodiment of the present invention.

FIG. 2 illustrates a detailed diagram of processor 109. Processor 109 can be implemented on one or more substrates using any of a number of process technologies, such as, BiCMOS, CMOS, and NMOS. Processor 109 comprises a decoder 202 for decoding control signals and data used by processor 109. Data can then be stored in register file 200 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight multimedia registers, $R_0$212*a* through $R_7$212*h*, for example, SIMD registers containing packed data. Each register in registers 209 is one hundred twenty-eight bits in length. R1 212*a*, R2 212*b* and R3 212*c* are examples of individual registers in registers 209. Thirty-two bits of a register in registers 209 can be moved into an integer register in integer registers 201. Similarly, an value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are one hundred twenty-eight bits in length and integers are represented as one hundred twenty-eight bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Data and Storage Formats

FIG. 3 illustrates three packed data-types: packed byte 221, packed word 222, and packed doubleword (dword) 223. Packed byte 221 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 222 is one hundred twenty-eight bits long and contains eight packed word data elements. Each packed word contains sixteen bits of information. Packed doubleword 223 is one hundred twenty-eight bits long and contains four packed doubleword data elements. Each packed doubleword data element contains thirty-two bits of information. A packed quadword is one hundred twenty-eight bits long and contains two packed quad-word data elements.

FIGS. 4A–4C illustrate the in-register packed data storage representation according to one embodiment of the invention. Unsigned packed byte in-register representation 310 illustrates the storage of an unsigned packed byte 201 in one of the multimedia registers 209, as shown in FIG. 4A. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen.

Thus, all available bits are used in the register. This storage arrangement increases the storage efficiency of the processor. As well, with sixteen data elements accessed, one operation can now be performed on sixteen data elements simultaneously. Signed packed byte in-register representation 311 illustrates the storage of a signed packed byte 221. Note that the eighth bit of every byte data element is the sign indicator.

Unsigned packed word in-register representation 312 illustrates how word seven through word zero are stored in a register of multimedia registers 209, as illustrated in FIG. 4B. Signed packed word in-register representation 313 is similar to the unsigned packed word in-register representation 312. Note that the sixteenth bit of each word data element is the sign indicator. Unsigned packed doubleword in-register representation 314 shows how multi-media registers 209 store two doubleword data elements, as illustrated in FIG. 4C. Signed packed doubleword in-register representation 315 is similar to unsigned packed doubleword in-register representation 314. Note that the necessary sign bit is the thirty-second bit of the doubleword data element.

Efficient filtering and convolution of content data, as taught by the present invention, begins with loading of data source devices with data and filter/convolution coefficients. In many cases, the order of data or coefficients within a data storage device, such as for example a single instruction multiple data (SIMD) register, require change before arithmetic calculations can be made. Accordingly, efficient filter calculations and convolution require not only appropriate arithmetic instructions, but also efficient methods for organizing the data required to make the calculations.

For example, using the notation in the background section, images are filtered by replacing the value of, for example pixel I given by S[I]. Values of pixels on either side of pixel I are used in the filter calculation of S[I]. Similarly, pixels on either side of pixel I+1 are required to compute the S[I+1]. Consequently, to compute filter results for more than one pixel in an SIMD register, data is duplicated and arranged in the SIMD register for the calculation.

Figure 5:
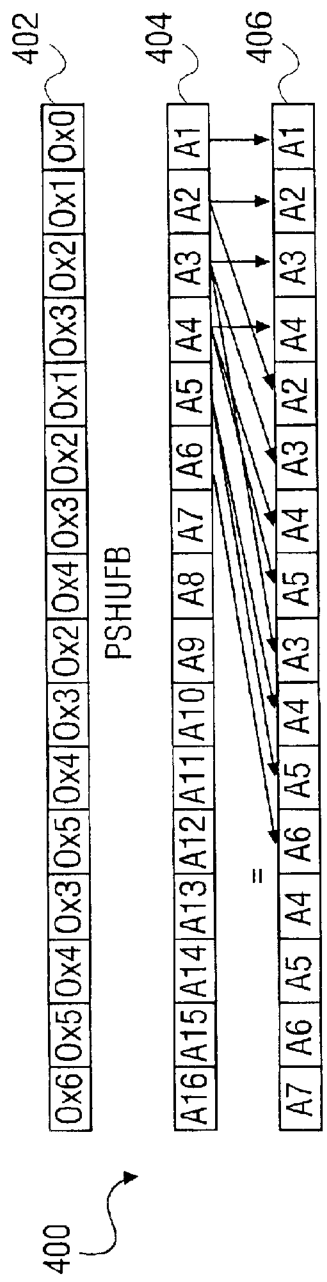
FIG. 5 depicts a block diagram illustrating operation of a byte shuffle instruction in accordance with an embodiment of the present invention.

Unfortunately, current computing architectures lack an efficient way of arranging data for all of the appropriate data sizes within the computing architecture. Accordingly, as depicted in FIG. 5, the present invention includes a byte shuffle instruction (PSHUFB) 145 that efficiently orders data of any size. The byte shuffle operation 145 orders data sizes, which are larger than bytes, by maintaining the relative position of bytes within the larger data during the shuffle operation. In addition, the byte shuffle operation 145 can change the relative position of data in an SIMD register and can also duplicate data.

Referring again to FIG. 5, FIG. 5 depicts an example of a byte shuffle operation 145 for a filter with three coefficients. Using conventional techniques, filter coefficients (not shown) would be applied to three pixels and then the filter coefficients are moved to another pixel and applied again. However, in order to perform these operations in parallel, the present invention describes a new instruction for the data arrangement. Accordingly, as depicted in FIG. 5, the data 404 is organized within a destination data storage device 406, which in one embodiment is the source data storage device 404, utilizing a mask 402 to specify the address wherein respective data elements are stored in the destination register 406. In one embodiment, the arrangement of the mask is based on the desired data processing operation, which may include for example, a filtering operation, a convolution operation or the like.

Accordingly. using the mask 402, processing of the data 406, along with the coefficients, can be performed in parallel. In the example described, the source data storage device 404 is a 128-bit SIMD register, which initially stores sixteen 8-bit pixels. As such, when utilizing a pixel filter with three coefficients, the fourth coefficient is set to zero. In one embodiment, depending on the number of data elements within the source data storage device 404, the source register 404 can be utilized as the destination data storage device or register, thereby reducing the number of registers than is generally necessary. As such, overwritten data within the source data storage device 404 may be reloaded from memory or from another register. In addition, multiple registers may be used as the source data storage device 404, with their respective data organized within the destination data storage device 406 as desired.

Once ordering of data elements, as well as coefficients is complete, the data and corresponding coefficients must be processed in accordance with a data processing operation. It is recognized by those skilled in the art that operations with different precisions are needed for filter calculation, as well as convolution calculation, utilizing different numbers of filter coefficients and data sizes. The most basic filter operation multiplies two pairs of numbers and adds their products. This operation is called a multiply-accumulate instruction.

Unfortunately, current computing architectures do not provide support for efficient multiply accumulate calculations for multiple array or filter lengths and multiple data sizes utilizing either signed or unsigned coefficients. In addition, byte operations are not supported. As a result, conventional computer architectures must convert 16 bit data using unpack instructions. These computer architectures generally include support for multiply-accumulate operations that compute the product of 16-bit data in separate registers and then add adjacent products to give a 32-bit result. This solution is acceptable for filter coefficients for data that require 16-bit precision, but for 8-bit filter coefficients, in 8 bit data (which is the general case for image and video), instructions and data level parallelism are wasted.

Figure 6:
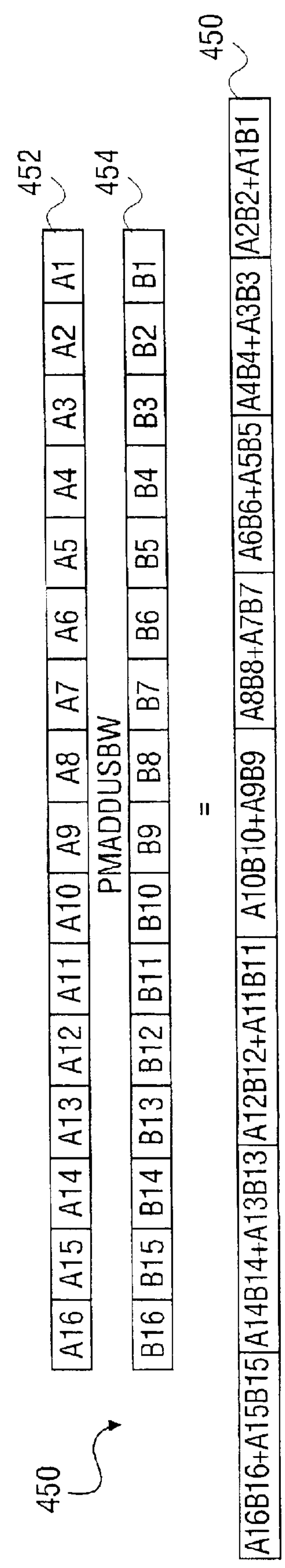
FIG. 6 depicts a block diagram illustrating a byte multiply-accumulate instruction in accordance with an embodiment of the present invention.

Referring now to FIG. 6, FIG. 6 depicts a first source register 452 and a second source register 454. In one embodiment, the first and second source registers are N-bit long SIMD registers, such as for example 128-bit Intel® SSE2 XMM registers. The multiply and accumulate instruction implemented on such a register would give the following results for two pixel vectors 452 and 454, which is stored within the destination register 456. Accordingly, the example shows an 8-bit byte to 16 word multiply-accumulate instruction called PMADDUSBW operation 147 (FIG. 1), in which the U and the S in the instruction pneumonically refer to unsigned and signed bytes. Bytes in one of the source registers are signed and in the other they are unsigned.

In one embodiment of the present invention, the register with the unsigned data is the destination and the 16 multiply-accumulate results. The reason for this choice is that in most implementations, data is unsigned and coefficients are signed. Accordingly, it is preferable to overwrite the data because the data is less likely to be needed in future calculations. Additional byte multiply-accumulate instructions as depicted in FIG. 1 are PMADDUUBW operation 149 for unsigned bytes in both registers and PMADDSSBW operation 151 for signed bytes in both source registers. The multiply-accumulate instructions are completed by a PMADDWD instruction 153 that applies to pairs of 16-bit signed words to produce a 32-bit signed product.

As is generally the case of filtering operations, the second vector generally contains the filter coefficients. Accordingly, to prepare an XXM register, the coefficients can be loaded within a portion of the register and copied to the rest of the register using the shuffle instruction 145. For example, as depicted in FIG. 7 A,, a coefficient data storage device 502. such as for example an XXM 128 bit register, is initially loaded with three coefficients in response to execution of a data load instruction. However, those skilled in the art will recognize that fllter coefficients may be organized in memory prior to data processing. As such, the coefficient may be initially loaded as depicted in FIG. 7B based on heir organization within memory, prior to filtering.

As such, the coefficient register 502 includes filter coefficients F3, F2 and F1, which can be coded as signed or unsigned bytes. Once the coefficient register 502 is loaded, the existing instruction PSHUFD can be used to copy the filter coefficients within the remaining portions of the coefficient register to obtain the following result as depicted in FIG. 7B. As depicted in FIG. 7B, the coefficient register 504 now includes shuffled coefficients as required to perform a data processing operation in parallel. As known to those skilled in the art, filters including three coefficients are very common in image processing algorithms. However, those skilled in the arc will recognize that certain filtering operations, such as JPEG 2000 utilize nine and seven 16-bit coefficients. Accordingly, processing of such coefficient exceeds the capacity of coefficient registers, resulting in a partially filtered result. Consequently, processing continues until a final result is obtained using each coefficient.

Referring now to FIG. 7C, FIG. 7C illustrates the arrangement of pixel data within a source register 506 that was initially contained within the source register 404 as depicted in FIG. 5 and shuffled within the destination register 406. Accordingly, in response to execution of a data processing operation, the PMADDUSBW instruction can be used to compute the sum of the two multiplications with the result stored in the destination register 510. Unfortunately, in order to complete calculation and generate data processing results for the selected data processing operation, adjacent summed-product pairs within the destination register 510 must be added.

Accordingly, if the sum of a multiply-accumulate instruction is longer than two pixels, which is generally the case, the separate sums have to be added. Unfortunately, current computing architectures do not provide an efficient method of adding adjacent sums, due to the fact that the adjacent sums are within the same destination register. Accordingly, the present invention utilizes adjacent-add instructions, the results of which are depicted in FIGS. 8A–8D.

Referring now to FIG. 8A, FIG. 8A depicts a destination register 552 following adding of two adjacent 16 bit values (PADDD2WD operation 157) to give a 32 bit sum. As such, FIG. 8A depicts two adjacent 16 bit results of a multiply-accumulate instruction, which are added to give 32 bit sum of 4 byte products. FIG. 8B depicts an adjacent-add instruction (PAADDD4WD operation 157), which adds 4 adjacent 16-bit values to give a 32-bit sum. As such, 4 adjacent 16-bit results of a byte multiply-accumulate instruction are added to give 32-bit sum of 8 byte products. FIG. 8C illustrates an adjacent-add instruction (PAADD8WD operation 157), which adds 8 adjacent 16-bit values to give a 32-bit sum. As such, the example illustrates 8 adjacent 16-bit results of a byte multiply-accumulate operation, which are added to give a 32-bit sum of 16 byte products.

Accordingly, the selection of the instruction to perform an adjacent-add operation is based on the number of turns in a sum (N). For example, utilizing a three tap filter as depicted in FIGS. 7A–7C, a first instruction (PAADD2WD operation 157) will obtain the following result as depicted in FIG. 8D. However, for correlation between two 16 bit pixel vectors (for example, the first line of a macro block), the last instruction (PAADD8WD operation 157), as depicted in FIG. 8C, is utilized. Such an operation is becoming increasingly important for an efficient implementation as SIMD registers increase in size. Without such an operation, many additional instructions are required.

As such, the set of adjacent-add instructions, as described by the present invention, support a wide range of numbers of adjacent values which can be added and a full range of common data types. In one embodiment, addition of adjacent 16 bit values includes a set of instructions (PAADDNWD operation 157) whose range begins with addition of two adjacent values (N=2) and doubles the number added to four (N=4) then to eight (N=8) and up to a total number in the register. The data size of the sum of 16 bit adjacent-additions is 32 bits. In an alternate embodiment, adjacent 16 bit values (PAADDWD operation 161) are added to yield a 32 bit sum.

In this alternate embodiment, no other instruction with the 16 bit data size is included because adjacent-add instructions with a 32 bit input are used to add the sum produced by the instruction with a 16 bit input. Both embodiments include a set of 32 bit adjacent-addition instructions (PAADDNDWD operation 159), whose range begins with the addition of two adjacent values (N=2) and doubles the number added to four (N=4), then eight (N=8), etc., up to the total number in the register. The data size of the sum of 32 bit adjacent-additions is 32 bits. In some cases, the results do not fill the register. For example, instructions as shown in FIGS. 8A, 8B and 8C, three different adjacent-adds yield 4, 2 and 1 32-bit results. In one embodiment, the results are stored in the lower, least significant parts of the destination data storage device.

Accordingly, when there are two 32-bit results, as depicted in FIG. 8B, the results are stored in the lower 64 bits. In the case of one 32-bit result, as illustrated in FIG. 8C, the results are stored in the lower 32 bits. As recognized by those skilled in the art, some applications utilize the sum of adjacent bytes. The present invention supports adjacent-addition of bytes with an instruction (PAADDNB operation 155) that adds two adjacent signed bytes giving a 16-bit word and an instruction that adds two adjacent unsigned bytes giving a 16-bit word result. Applications that require addition of more than two adjacent bytes add the 16-bit sum of two bytes with an appropriate 16 bit adjacent-add operation.

Once data processing operation results have been calculated, the next operation consists in routing the results back to a memory device. As illustrated by the embodiments described above, the results can be coded with a 32-bit precision. Therefore, results can be written back to memory using simple move operations acting on doublewords, for example, the MOVD operation 143 described above as well as Shift Right logical operations acting on the whole register (PSRLDQ), shift double quad-word right logical. As such, writing all results back to memory would need four MOVD and three PSRLDQ in the first case (FIG. 8A), two MOVD and one PSRLDQ in the second case (FIG. 8B) and finally, just one MOVD in the final case, as depicted in FIG. 8C.

Figure 9A:
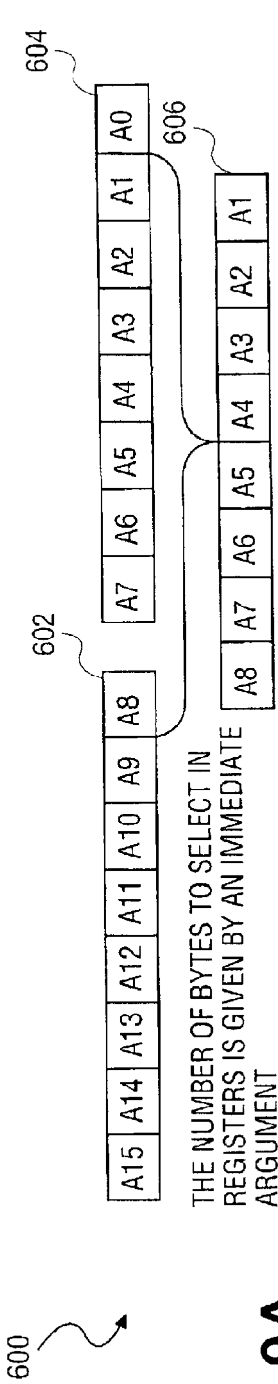
FIGS. 9A and 9B depict a register merge instruction in accordance with a further embodiment of the present invention.

Unfortunately, although the adjacent-add operations, as depicted in FIG. 7C, can be performed in parallel, filtering computations generally require the next pixel in the image. As such, one or more pixels need to be loaded in a source data storage device or register. In order to avoid loading the eight pixels each time in the registers, two solutions are proposed for this operation. In one embodiment, the present invention describes a register merge operation 163, as depicted in FIG. 9A. As such, in order to process pixels A1–A8 within a destination register 606, pixels A7–A1 are concatenated with pixel A8 to form pixels A8–A1 in destination register 606. Accordingly, the register merge operation utilizes the number of bytes to select registers, which is provided by an input argument.

Figure 9B:
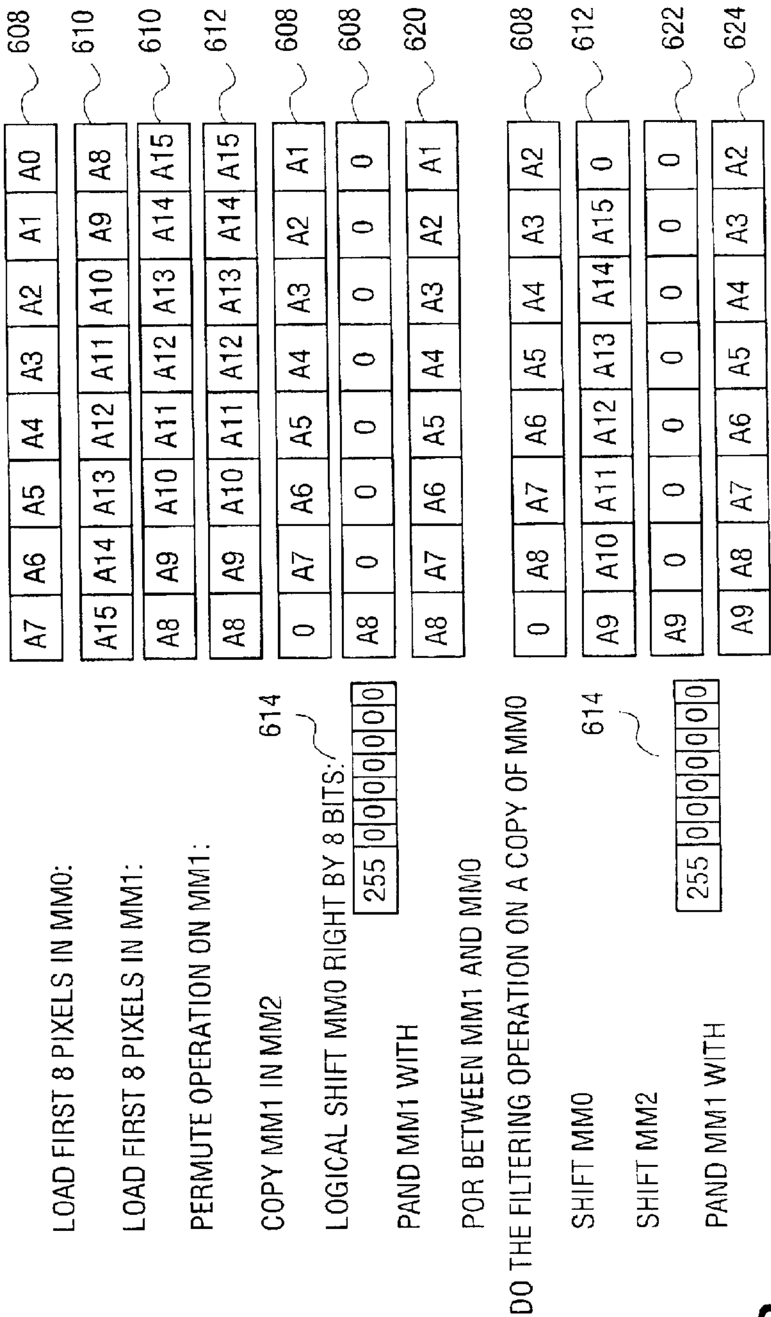

Referring now to FIG. 9B, FIG. 9B depicts an alternate embodiment for performance of the register merge operation. Initially, eight pixels are loaded into a first source register 608 (MMM0). Next, a subsequent eight pixels are loaded in a second source register (MMM1) 610. Next, a permute operation is performed on the second source register 610. Once performed, register 610 is copied to a third source register (MMM2) 612. Next, the first source register 608 is right-shifted by eight bits. In addition, the second source register 610 and a mask register 614 are combined in accordance with a packed logical AND instruction and stored within the first source register 608.

Next, a logical OR operation is performed between the second source register 610 and the first source register 608 to produce the following result within the destination register 620, resulting in the register merge operation. The process continues as illustrated by shifting the first source register 608. Next, the second source register 610 is shifted to yield the register 612. Next, a logical AND operation is performed between the mask register 614 and the second source register 612, with the results stored in a destination register 622. Finally, a packed OR operation is performed between the second source register 612 and the first source register 608 to yield a subsequent register merge operation within the destination register 624. Procedural methods for implementing the teachings of the present invention are now described.

Operation

Figure 10:
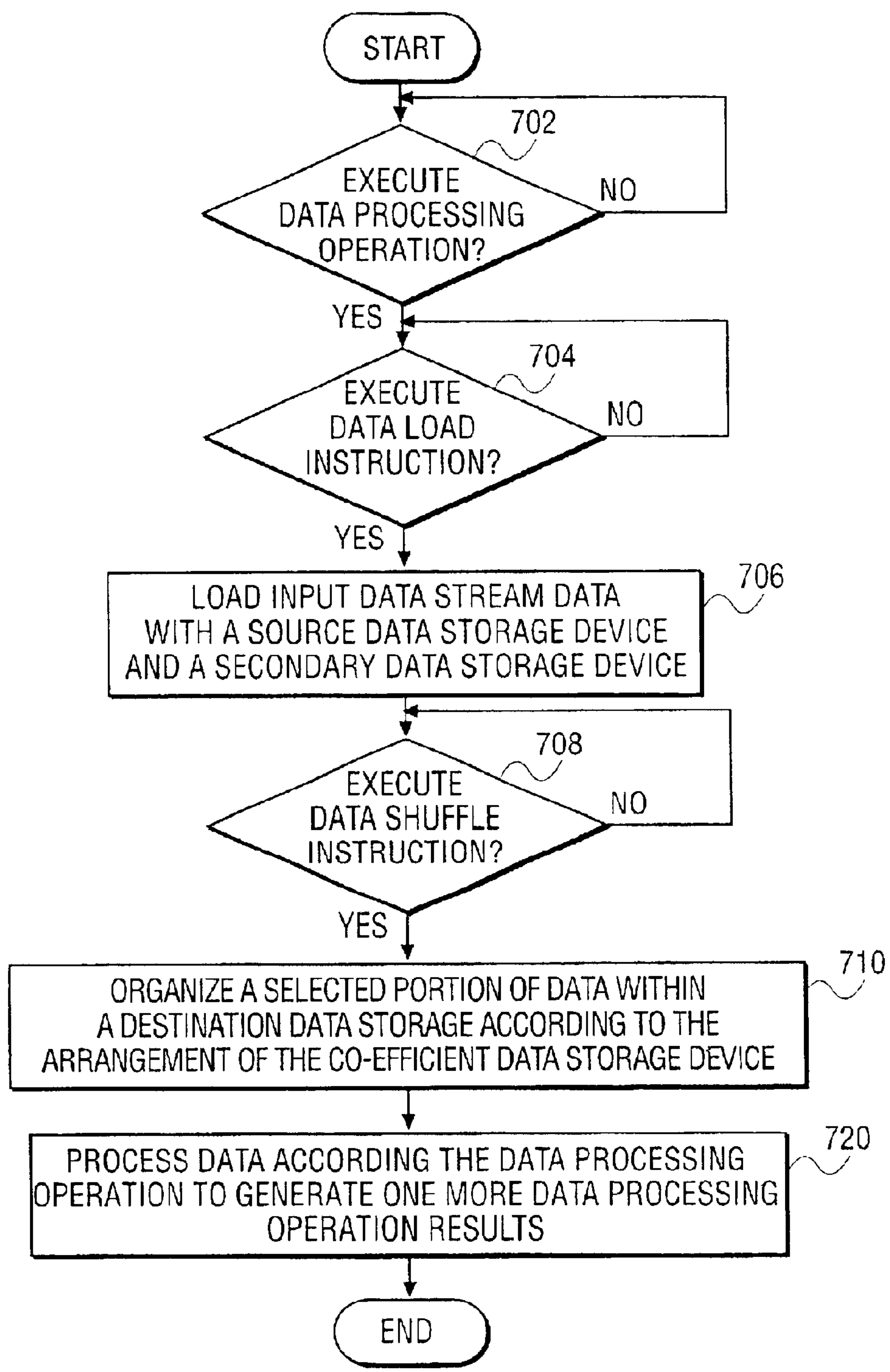
FIG. 10 depicts a block diagram illustrating a flowchart for efficient data processing of content data in accordance with one embodiment of the present invention.

Referring now to FIG. 10, FIG. 10 depicts a block diagram illustrating a method 700 for efficient filtering and convolution of content data within, for example, the computer system 100 as depicted in FIGS. 1 and 2. As described herein, content data refers to image, audio, video and speech data. In addition, the present invention refers to data storage devices, which as recognized by those skilled in the art, include various devices capable of storing digital data including, for example, data registers such as 128-bit Intel® architecture SSE2 MMX registers.

Referring again to FIG. 10, the method begins at process block 702, wherein it is determined whether a data processing operation is executed. As described herein, the data processing operation includes, but it is not limited to, convolution and filtering operations performed on pixel data. Once executed process block 704 is performed. At process block 704, a data load instruction is executed. In the response to execution of the data load instruction, at process block 706 input data stream data is loaded within a source data storage device 212A and a secondary data storage device 212B, for example as depicted in FIG. 2.

At process block 708, it is determined whether the data processing operation has executed a data shuffle instruction. In response to executing a data shuffle instruction, at process block 710, a selected portion of data from, for example, a source data storage device 212B is organized within a destination data storage device or according to an arrangement of coefficients within a coefficient data storage device (see FIG. 5). Coefficients within a coefficient data storage device are organized according to the desired data processing operation calculations (for example, as illustrated in FIGS. 7A and 7B). In one embodiment, coefficients are organized within memory prior to any filtering operations. Accordingly, coefficients may be loaded in a coefficient data storage without the need for shuffling (see FIG. 7B), As described above, ordering data and coefficients is required to implement parallel calculations, as required by the data processing operation, as depicted in FIGS. 7A–7C. However, since the coefficients are known prior to the data processing operation, coefficients may be organized in memory, to enable loading into a coefficient register as organized within memory without the need to shuffle the coefficients during the data processing operation. Finally, at process block 720, the loaded data is processed according to the data processing operation to generate one or more data processing results. Once generated, the data processing operation results can be written back to memory.

Figure 11:
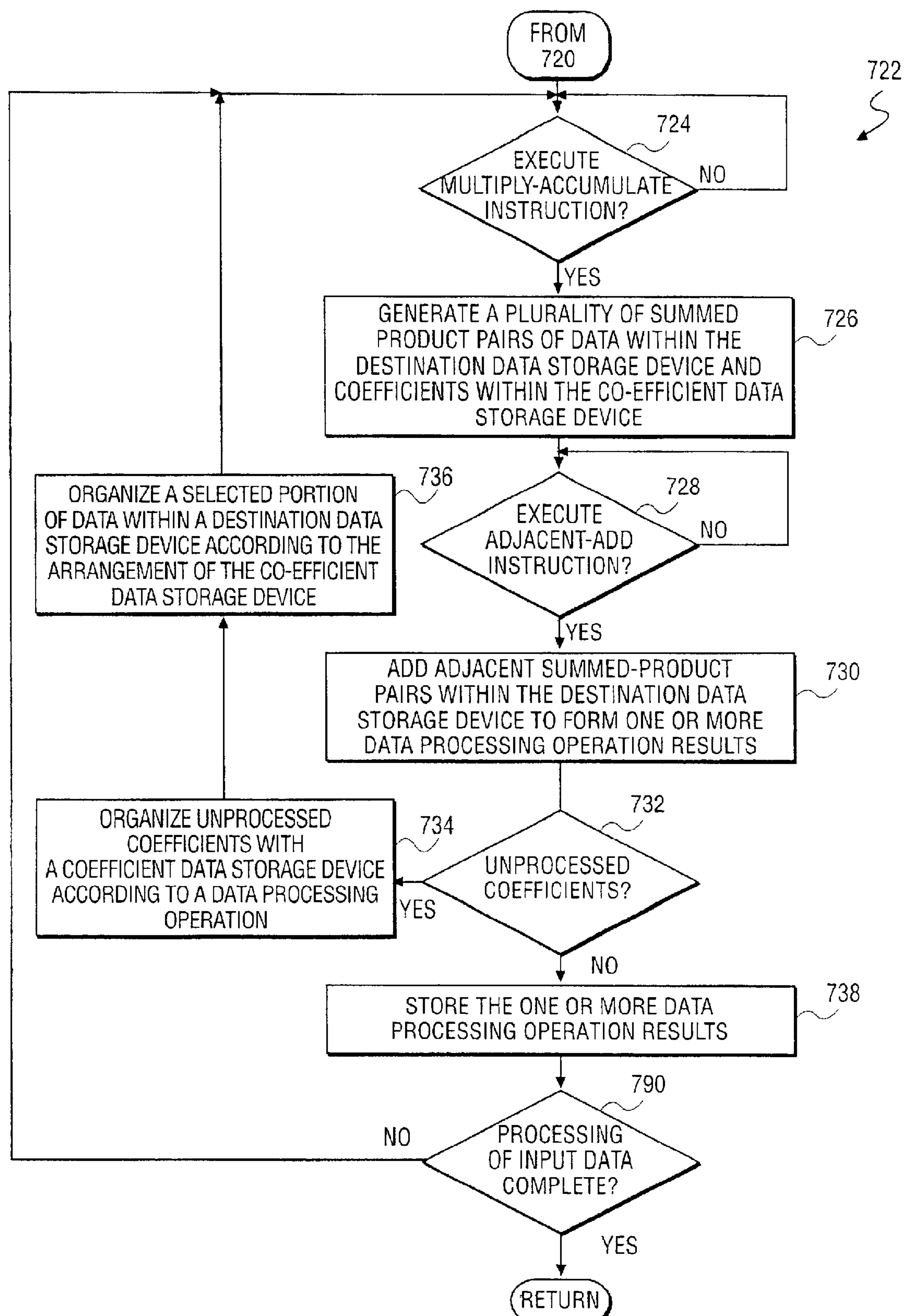
FIG. 11 depicts a block diagram illustrating an additional method for processing content data according to a data processing operation in accordance with a further embodiment of the present invention.

Referring now to FIG. 11, FIG. 11 depicts a block diagram illustrating a method 722 for processing data according to the data processing operation. At process block 724, it is determined whether the data processing operation has executed a multiply-accumulate instruction. In response to execution of the multiply-accumulate instruction, at process block 726, a plurality of summed-product pairs of data within the destination storage device and coefficients within the coefficient data storage device are generated, as depicted in FIG. 7C. Next, at process block 728, it is determined whether the data processing operation has executed an adjacent-add instruction.

In response to execution of the adjacent-add, at process block 730, adjacent summed-product pairs within the destination data storage device 510 (FIG. 7C) are added in response to execution of the adjacent-add instruction to form one or more data processing operation results (see FIG. 8D). However, in certain embodiments, where the number of coefficients exceeds a capacity of the coefficient register (see process block 732), partial data processing results are obtained. Consequently, processing and organizing of coefficients (process block 734) data (process block 736) and continues until final data processing operation results are obtained, as indicated in optional process blocks 732–736. Otherwise, at process block 738, the one or more data processing operation results are stored. Finally, at process block 790, it is determined whether processing of input data stream data is complete. As such, process blocks 724–732 are repeated until processing of input data stream data is complete. Once processing is complete, control flow returns to process block 720, wherein the method 700 terminates.

Figure 12:
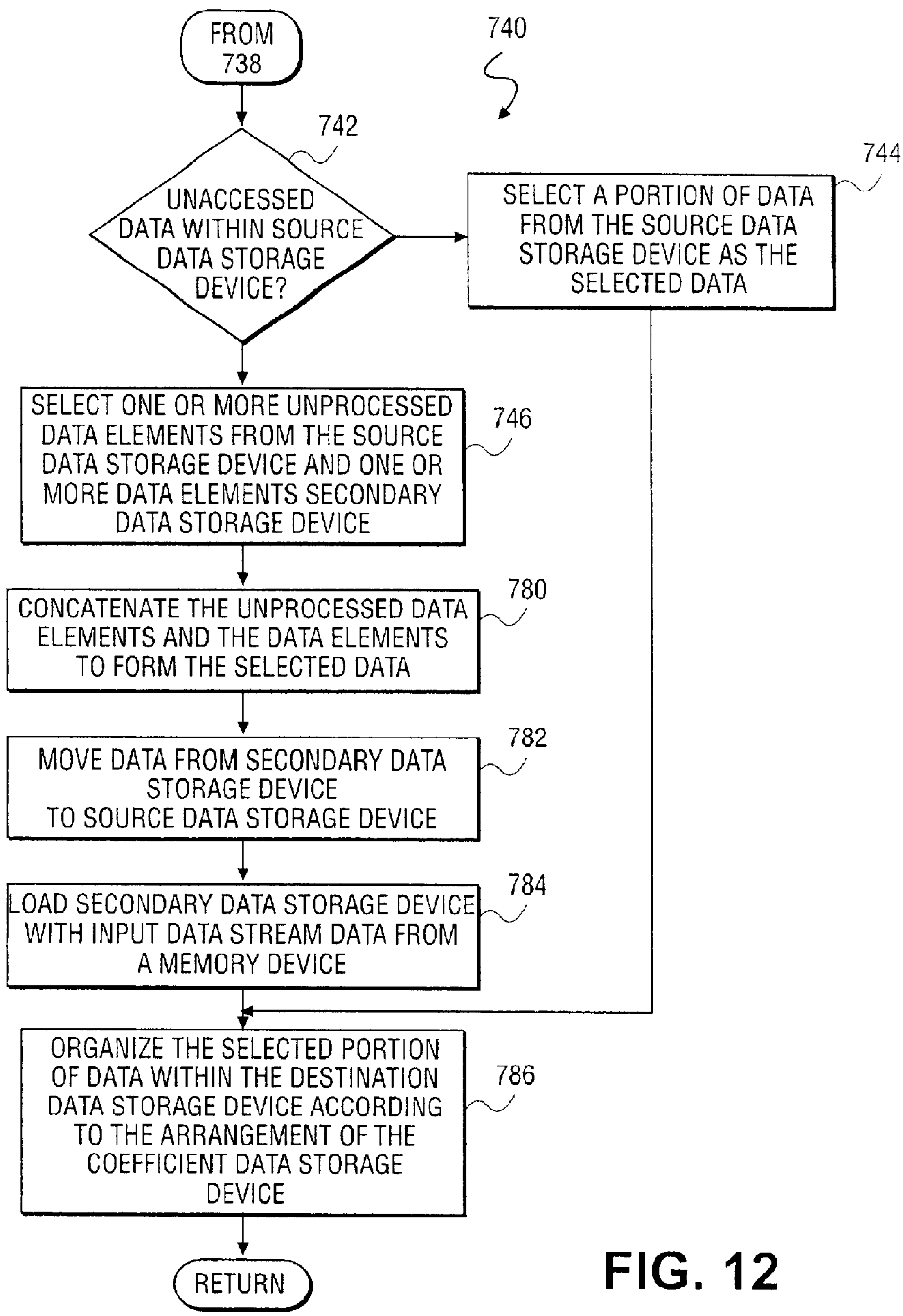
FIG. 12 depicts a block diagram illustrating a flowchart for continued processing of content data in accordance with a further embodiment of the present invention.

Referring now to FIG. 12, FIG. 12 depicts a block diagram illustrating an additional method 740 for processing additional input data. At process block 742, it is determined whether there is any unaccessed data within the source data storage device 212A. As described herein, unaccessed data refers to data within the source data storage device 212A that has not been shuffled within the data storage device in order to perform a multiply-accumulate instruction. When the data storage device contains unaccessed data, at process block 744, a portion of data is selected from the source data storage device as the selected data. Once selected, process block 786 is performed.

Otherwise, at process block 746, one or more unprocessed data elements are selected from the source data storage device, as well as one or more data elements from a secondary data storage device. As described herein, unprocessed data elements refer to data elements for which a data processing operation result has not yet been calculated. Next, at process block 780, a register merger instruction (see FIGS. 9A and 9B) is performed which concatenates the unprocessed data elements of the source data storage device with the data elements selected from the secondary data storage device to form the selected data. Next, at process block 782, data from the secondary data storage device is moved to the source data storage device.

As such, the source data storage device data is no longer required, since it has all been accessed. Accordingly, the secondary storage of data, which contains unaccessed data, can be used to overwrite data within the source data storage device. At process block 784, the secondary data storage device is loaded with input data stream data from a memory device, which requires additional data processing, such as filtering or convolution. Finally, at process block 786, the selected data is organized within a destination data storage device or according to the arrangement of coefficients within the coefficient data storage device (see FIG. 5). Once performed, control flow returns to process block 790, as depicted in FIG. 11 for continued processing of the selected data.

Figure 13:
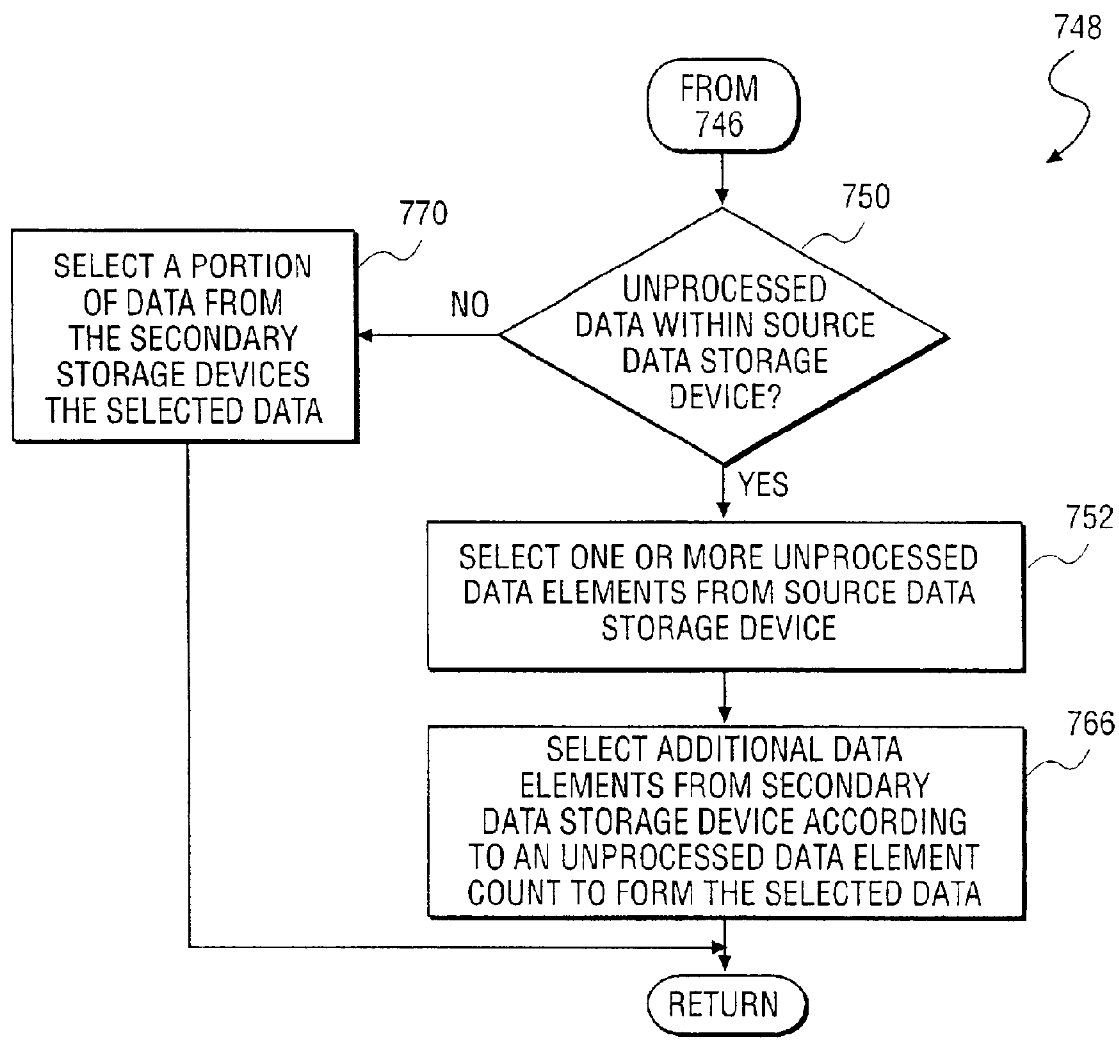
FIG. 13 depicts a block diagram illustrating a flowchart illustrating a register merge operation in accordance with a further embodiment of the present invention.

Referring now to FIG. 13, FIG. 13 depicts an additional method 748 for selecting unprocessed data elements. At process block 750, it is determined whether the source data storage device contains unprocessed data. When each portion of data within the source data storage device has been processed, process block 770 is performed. At process block 770, a portion of data is selected from the secondary data storage device, which functions as the selected data, which is then processed in accordance with the data processing operation.

Otherwise, at process block 752, one or more unprocessed data elements are selected from the source data storage device. Finally, at process block 766, additional data elements are selected from the secondary data storage device according to a count of the unprocessed data elements to form the selected data. As such, data selected for shuffling within a destination data storage device prior to performing of the data processing operation is limited to a count of data elements based on the number of filter coefficients. Accordingly, using this data element count, the number of unprocessed data elements is subtracted from the data element count in order to determine the number of elements to select from the secondary data storage device in order to perform the register merge operation.

Figure 14:
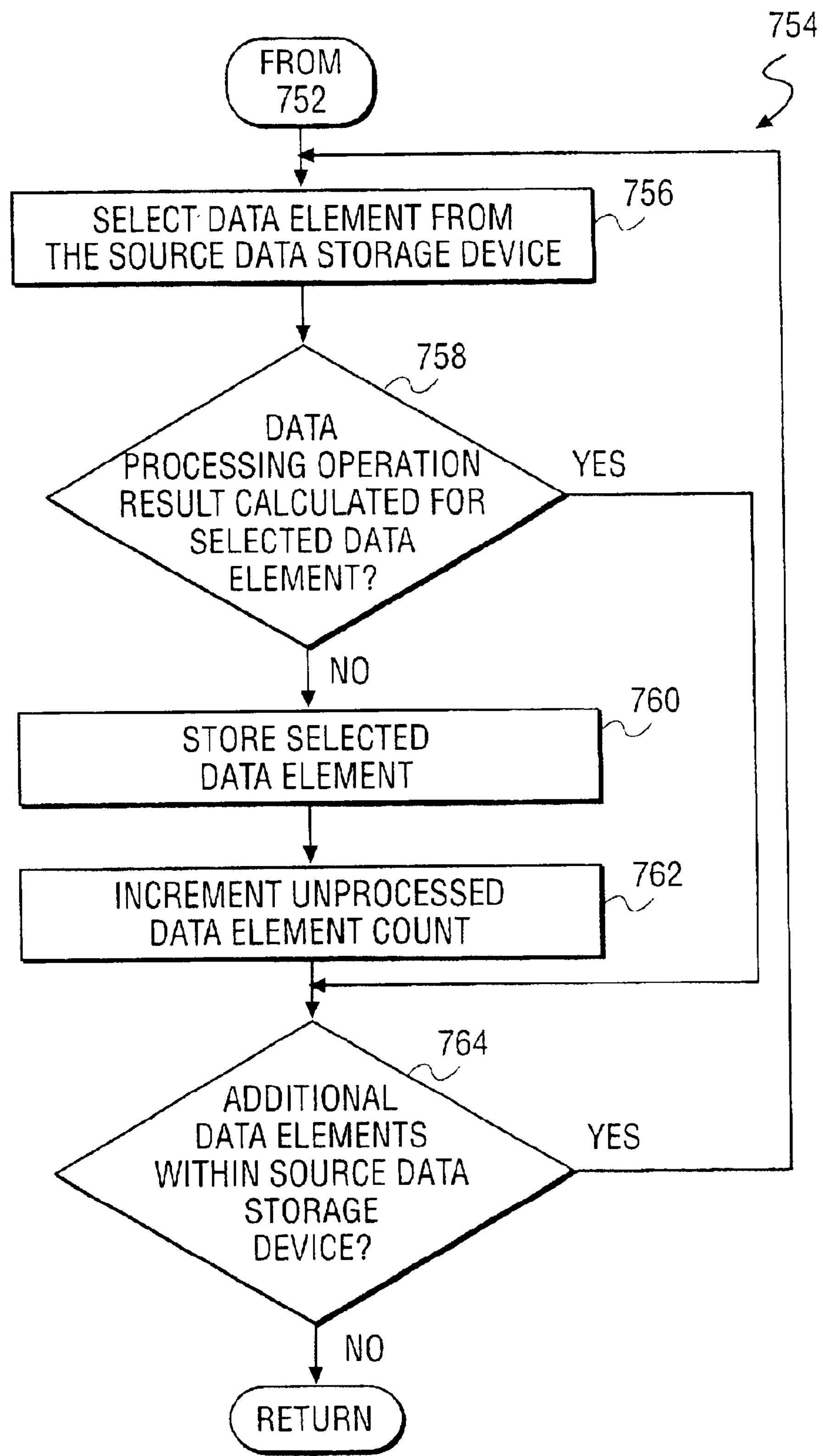
FIG. 14 depicts a flowchart illustrating an additional method for selecting unprocessed data elements from a source data storage device in accordance with an exemplary embodiment of the present invention.

Finally, referring to FIG. 14, FIG. 14 depicts an additional method 754 for selecting unprocessed data elements of process block 752, as depicted in FIG. 13. At process block 756, a data element is selected from the source data storage device. Next, at process block 758, it is determined whether a data processing operation result has been calculated for the data element. When such a result has been calculated, the selected data element is discarded. Otherwise, at process block 760, the selected data element is an unprocessed data element and is stored. Next, at process block 762, an unprocessed data element count is incremented. Finally, at process block 764, process blocks 756–762 are repeated until each data element within the source data storage device is processed.

As such, utilizing the teachings of the present invention, unnecessary data type changes are avoided, resulting in a maximization of the number of SIMD operations per instructions. In addition, a significant reduction in the number of clock cycles required to order data for arithmetic operations is also achieved. Accordingly, Table 1 gives estimates speed-up values for several filtering applications using the teachings and instructions described by the present invention.

TABLE 1

| Operation | Speedup |
|---|---|
| 9–7 wavelet | 1.7 |
| 3 × 3 filter with byte coefficients | 4.3 |
| watermark correlation | 6.8 |

ALTERNATE EMBODIMENTS

Several aspects of one implementation of the computing architecture for providing efficient filtering and convolution of content data using SIMD registers have been described. However, various implementations of the computing architecture provide numerous features including, complementing, supplementing, and/or replacing the features described above. Features can be implemented as part of the computing architecture or as part of specific software or hardware components in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a system for efficient filtering and convolution of content data using SIMD registers, it will be appreciated by those skilled in the art that the teaching of the present invention can be applied to other systems. In fact, systems for processing image, audio and video data are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to efficiently implement operations for filtering/convolution for multiple array lengths and data sizes and coefficient signs. These operations are accomplished by using a few instructions that are a part of a small group of single instruction multiple clara (SIMD) instructions. Accordingly, the present invention avoids unnecessary data type changes. As a result, by avoiding unnecessary data type changes, the present invention maximizes the number of SIMD operations per instruction, while significantly reducing the number of clock cycles required to order data for arithmetic operations such as multiply-accumulate operations.

Having disclosed exemplary embodiments and the best mode, modifications and variations may be made to the disclosed embodiments while remaining within the scope of the invention as defined by the following claims.

What is claimed is:

1. A method comprising:

organizing, in response to executing a data shuffle instruction, a selected portion of data within a destination data storage device according to an arrangement of coefficients within a coefficient data storage device;

generating, in response to executing a multiply-accumulate instruction, a plurality of summed-product pairs of data within the destination data storage device and coefficients within the coefficient data storage device;

adding, in response to executing an adjacent-add instruction, adjacent summed-product pairs within the destination data storage device to form one or more data processing operation results; and storing the one or more data processing operation results.

2. The method of claim 1, wherein prior to organizing, the method further comprises:

loading a source data storage device with input data stream data from a memory device;

loading, within a secondary data storage device, additional data from the memory device; and loading the coefficients into the coefficient data storage device, as organized within the memory device, according to a data processing operation.

3. The method of claim 2, wherein the data processing operation is one of a filtering operation and a convolution operation.

4. The method of claim 2, wherein the source data storage device is a single instruction multiple data register, the secondary data storage device is a singe instruction multiple data register and the destination data storage device is a single instruction multiple data register.

5. The method of claim 1, further comprising:

while a source data storage device contains unaccessed data, selecting a portion of data from the source data storage device as the selected portion of data;

otherwise, selecting one or more unprocessed data elements from the source data storage device and one or more data elements from a secondary data storage device; and concatenating the one or more unprocessed data elements with the data elements from the secondary data storage device to form the selected portion of data;

once all data within the source data storage device is accessed, moving data from the secondary data storage device to the source data storage device;

once moving of the data within the source data storage device is complete, loading the secondary data storage device with input data stream data from a memory device; and repeating the organizing, generating, adding, storing, selecting, concatenating, moving and loading until a data processing operation result is generated for each data element within the input stream data contained within the memory device.

6. The method of claim 5, wherein selecting data elements further comprises:

when the source data storage device contains unprocessed data, selecting the unprocessed data elements;

based on a count of the unprocessed data elements, determining a number of data elements to be selected from the secondary data storage device; and selecting a data element from the secondary data storage device according to the determined number of data elements.

7. The method of claim 6, wherein selecting the unprocessed data elements further comprises:

determining one or more data elements from the source data storage device for which a data processing operation results is required; and selecting each data element which requires a data processing operation result as an unprocessed data element.

8. The method of claim 1, further comprising:

repeating, in response to executing a data processing instruction, the organizing, generating, adding and storing for each data element of an input data stream within a memory device.

9. The method of claim 1, wherein storing the results further comprises:

when a number of the coefficients exceeds the capacity of the coefficient data storage device, selecting a remaining portion of the plurality of coefficients;

organizing, in response to executing a data shuffle instruction, the selection of coefficients within the coefficient data storage device according to a data processing operation; and repeating the organizing, generating and adding until final data processing operation results are obtained.

10. A method comprising:

loading, in response to executing a data load instruction, input data stream data within a source data storage device and a secondary data storage device;

loading coefficients into a coefficient data storage device, as organized within a memory device, according to a data processing operation;

organizing, in response to executing a data shuffle instruction, a selected portion of data within a destination data storage device, according to the arrangement of coefficients within the coefficient data storage device; and processing, according to the data processing operation, data within the destination data storage device using coefficients within the coefficient data storage device to generate one or more data processing results.

11. The method of claim 10, further comprising:

while a source data storage device contains unaccessed data, selecting a portion of data from the source data storage device as the selected portion of data;

otherwise, selecting one or more unprocessed data elements from the source data storage device and one or more data elements from a secondary data storage device; and concatenating the one or more unprocessed data elements with the data elements from the secondary data storage device to form the selected portion of data;

when all data within the source data storage device is accessed, moving data from the secondary data storage device to the source data storage device;

once all data is moved within the source data storage device, loading the secondary data storage device with input data stream data from a memory device; and repeating the organizing, generating, adding, storing, selecting, concatenating, moving and loading until a data processing operation result is generated for each data element within the input stream data contained within the memory device.

12. The method of claim 11, wherein selecting data elements further comprises:

when the source data storage device contains one or more unprocessed data elements, selecting the one or more unprocessed data elements;

based on a count of the one or more unprocessed data elements, determining a number of data elements to be selected from the secondary data storage device; and selecting a data element from the secondary data storage device according to the determined number of data elements.

13. The method of claim 11, wherein selecting the unprocessed data elements further comprises:

determining one or more data elements from the source data storage device for which a data processing operation results is required; and selecting each data element which requires a data processing operation result as an unprocessed data element.

14. The method of claim 10, wherein processing data further comprises:

generating, in response to executing a multiply-accumulate instruction, a plurality of summed-product pairs of data within the destination data storage device and coefficients within the coefficient data storage device;

adding, in response to executing an adjacent-add instruction, adjacent summed-product pairs within the destination data storage device to form one or more filtering operation results;

when a number of the coefficients exceeds the capacity of the coefficient data storage device, selecting a remaining portion of the plurality of coefficients;

organizing, in response to executing a data shuffle instruction, the selected coefficients within the coefficient data storage device according to the filtering operation;

organizing, in response to executing a data shuffle instruction, a selected portion of data within a destination data storage device according to the arrangement of coefficients within the coefficient data storage device;

repeating the organizing, generating and adding until final filtering operation results are obtained; and storing the final filtering operation results.

15. The method of claim 10, wherein processing the data further comprises:

generating, in response to executing a multiply-accumulate instruction, a plurality of summed-product pairs of the data within the destination data storage device and the coefficients within the coefficient data storage device;

adding, in response to executing an adjacent-add instruction, adjacent summed-product pairs within the destination data storage device to form one or more convolution operation results; and when a number of the coefficients exceeds the capacity of the coefficient data storage device, selecting a remaining portion of the plurality of coefficients;

organizing, in response to executing a data shuffle instruction, the selected coefficients within the coefficient data storage device according to the convolution operation;

organizing, in response to executing a data shuffle instruction, a selected portion of data within a destination data storage device according to the arrangement of coefficients within the coefficient data storage device;

repeating the organizing, generating and adding until final convolution operation results are obtained; and storing the final convolution operation results.

16. A computer readable storage medium including program instructions that when executed by a processor, perform a method comprising:

organizing, in response to executing a data shuffle instruction, a selected portion of data within a destination data storage device according to an arrangement of coefficients within a coefficient data storage device;

generating, in response to executing a multiply-accumulate instruction, a plurality of summed-product pairs of data within the destination data storage device and coefficients within the coefficient data storage device;

adding, in response to executing an adjacent-add instruction, adjacent summed-product pairs within the destination data storage device to form one or more results of a data processing operation; and storing the one or more data processing operation results.

17. The computer readable storage medium of claim 16, wherein storing the results further comprises:

when a number of the coefficients exceeds the capacity of the coefficient data storage device, selecting a remaining portion of the plurality of coefficients;

organizing, in response to executing a data shuffle instruction, the selection of coefficients within the coefficient data storage device according to the data processing operation; and repeating the organizing, generating and adding until final data processing operation results are obtained.

18. The computer readable storage medium of claim 16, wherein prior to organizing, the method further comprises:

loading a source data storage device with input data stream data from a memory device;

loading, within a secondary data storage device, additional data from the memory device;

loading the plurality of coefficients into the coefficient data storage device, as organized within the memory device, according to a data processing operation.

19. The computer readable storage medium of claim 18, wherein the source data storage device is a single instruction multiple data register, the secondary data storage device is a single instruction multiple data register and the destination data storage device is a single instruction multiple data register.

20. The computer readable storage medium of claim 16, further comprising:

while a source data storage device contains unaccessed data, selecting a portion of data from the source data storage device as the selected data;

otherwise, selecting one or more unprocessed data elements from the source data storage device and one or more data elements from a secondary data storage device;

concatenating the one or more unprocessed data elements with the data elements from the secondary data storage device to form the selected data;

once all data within the source data storage device is accessed, moving data from the secondary data storage device to the source data storage device;

once moving of the data within the source data storage device is complete, loading the secondary data storage device with input data stream data from a memory device; and repeating the organizing, generating, adding, storing, selecting, concatenating, moving and loading until a data processing operation result is generated for each data element within the input stream data contained within the memory device.

21. The computer readable storage medium of claim 20, wherein selecting data elements further comprises:

when the source data storage device contains unprocessed data, selecting the unprocessed data elements;

based on a count of the unprocessed data elements, determining a number of data elements to be selected from the secondary data storage device; and selecting a data element from the secondary data storage device according to the determined number of data elements.

22. The computer readable storage medium of claim 21, wherein selecting the unprocessed data elements further comprises:

determining one or more data elements from the source data storage device for which a data processing operation results is required; and selecting each data element which requires a data processing operation result as an unprocessed data element.

23. The computer readable storage medium of claim 16, further comprising:

repeating, in response to executing a data processing instruction, the organizing, generating, adding and storing for each data element of an input data stream within a memory device.

24. The computer readable storage medium of claim 16, wherein the data processing operation is one of a filtering operation and a convolution operation.

25. A computer readable storage medium including program instructions that direct a computer to function in a specified manner when executed by a processor, the program instructions comprising:

loading, in response to executing a data load instruction, input data stream data within a source data storage device and a secondary data storage device;

loading, in response to executing a data load instruction, coefficients into a coefficient data storage device, as organized within memory;

organizing, in response to executing a data shuffle instruction, a selected portion of data within a destination data storage device according to the arrangement of coefficients within the coefficient data storage device; and processing, according to the data processing operation, data within the source data storage device and the secondary data storage device to generate one or more data processing results.

26. The computer readable storage medium of claim 25, further comprising:

while a source data storage device contains unaccessed data, selecting a portion of data from the source data storage device as the selected portion of data;

otherwise, selecting one or more unprocessed data elements from the source data storage device and one or more data elements from a secondary data storage device; and concatenating the one or more unprocessed data elements with the data elements from the secondary data storage device to form the selected portion of data;

when all data within the source data storage device is accessed, moving data from the secondary data storage device to the source data storage device;

once all data is moved within the source data storage device, loading the secondary data storage device with input data stream data from a memory device; and repeating the organizing, generating, adding, storing, selecting, concatenating, moving and loading until a data processing operation result is generated for each data element within the input stream data contained within the memory device.

27. The computer readable storage medium of claim 26, wherein selecting the unprocessed data elements further comprises:

determining one or more data elements from the source data storage device for which a data processing operation result is required; and selecting each data element which requires a data processing operation result as an unprocessed data element.

28. The computer readable storage medium of claim 25, wherein processing data further comprises:

generating, in response to executing a multiply-accumulate instruction, a plurality of summed-product pairs of data within the destination data storage device and coefficients within the coefficient data storage device;

adding, in response to executing an adjacent-add instruction, adjacent summed-product pairs within the destination data storage device to form one or more filtering operation results;

when a number of the coefficients exceeds the capacity of the coefficient data storage device, selecting a remaining portion of the plurality of coefficients;

organizing, in response to executing a data shuffle instruction, the selected coefficients within the coefficient data storage device according to the filtering operation;

organizing, in response to executing a data shuffle instruction, a selected portion of data within a destination data storage device according to the arrangement of coefficients within the coefficient data storage device;

repeating the organizing, generating and adding until final convolution operation results are obtained; and storing the final filtering operation results.

29. The computer readable storage medium of claim 25, wherein processing data further comprises:

generating, in response to executing a multiply-accumulate instruction, a plurality of summed-product pairs of data within the destination data storage device and the coefficients within the coefficient data storage device;

adding, in response to executing an adjacent-add instruction, adjacent summed-product pairs within the destination data storage device to form one or more convolution operation results;

when a number of the coefficients exceeds the capacity of the coefficient data storage device, selecting a remaining portion of the plurality of coefficients;

organizing, in response to executing a data shuffle instruction, the selected coefficients within the coefficient data storage device according to the convolution operation;

organizing, in response to executing a data shuffle instruction, a selected portion of data within a destination data storage device according to the arrangement of coefficients within the coefficient data storage device;

repeating the organizing, generating and adding until final convolution operation results are obtained; and storing the final convolution operation results.

30. The computer readable storage medium of claim 26, wherein selecting data elements further comprises:

when the source data storage device contains one or more unprocessed data elements, selecting the one or more unprocessed data elements;

based on a count of the one or more unprocessed data elements, determining a number of data elements to be selected from the secondary data storage device; and selecting a data element from the secondary data storage device according to the determined number of data elements.

31. An apparatus, comprising:

a processor having circuitry to execute instructions;

a storage device coupled to the processor, having sequences of instructions stored therein, which when executed by the processor cause the processor to:

load coefficients into a coefficient data storage device, as organized within a memory device, according to a data processing operation;

organize, in response to executing a data shuffle instruction, a selected portion of data within the destination data storage device, according to the arrangement of coefficients within the coefficient data storage device; and process, according to the data processing operation, data within the destination data storage device using coefficients with a data storage device to generate one or more data processing results.

32. The apparatus of claim 31, wherein executing the sequences of instructions further causes the processor to:

generate, in response to executing a multiply-accumulate instruction, a plurality of summed-product pairs of data within the destination data storage device and coefficients within the coefficient data storage device;

add, in response to executing an adjacent-add instruction, adjacent summed-product pairs within the destination data storage device to form one or more data processing operation results; and store the one or more data processing operation results.

33. The apparatus of claim 31, wherein executing the sequences of instructions further causes the processor to:

load, in response to executing a data load instruction, input data stream data into a source data storage device and a secondary data storage device; and select, as the selected portion data, data contained within one or more of the source data storage device and the secondary data storage device.

* * * * *